United States Patent
Chen et al.

(10) Patent No.: US 8,454,274 B2
(45) Date of Patent: Jun. 4, 2013

(54) CUTTING INSERTS

(75) Inventors: Shi Chen, Huntingdon, PA (US);
Nicholas J. Henry, Latrobe, PA (US);
Kent P. Mizgalski, Stahistown, PA (US)

(73) Assignee: Kennametal Inc., Latrobe, PA (US)

( * ) Notice: Subject to any disclaimer, the term of this patent is extended or adjusted under 35 U.S.C. 154(b) by 393 days.

(21) Appl. No.: 12/878,460

(22) Filed: Sep. 9, 2010

(65) Prior Publication Data

US 2011/0020074 A1    Jan. 27, 2011

Related U.S. Application Data

(63) Continuation-in-part of application No. 12/784,591, filed on Sep. 2, 1010, which is a continuation-in-part of application No. 11/654,918, filed on Jan. 18, 2007, now Pat. No. 7,883,299.

(51) Int. Cl.
*B23B 27/16* (2006.01)
*B23B 27/10* (2006.01)

(52) U.S. Cl.
USPC ............................. 407/11; 407/113; 408/57

(58) Field of Classification Search
USPC .............. 407/11, 113–116, 102–107; 408/56, 408/57
IPC ............................................. B23B 27/10,27/16
See application file for complete search history.

(56) References Cited

U.S. PATENT DOCUMENTS

| | | | |
|---|---|---|---|
| 160,161 A | 2/1875 | Clay | |
| 522,588 A | 7/1894 | Chouteau | |
| 1,296,536 A | 3/1919 | Leech | |
| 2,575,239 A * | 11/1951 | Stephens | 175/383 |
| 2,677,170 A * | 5/1954 | Kuns et al. | 407/116 |
| 2,870,523 A | 1/1959 | Richard | |
| 3,077,802 A | 2/1963 | Philip | |

(Continued)

FOREIGN PATENT DOCUMENTS

| | | |
|---|---|---|
| DE | 3004166 C2 | 2/1980 |
| DE | 3429842 A1 | 2/1986 |

(Continued)

OTHER PUBLICATIONS

PCT/US2011/046985 Notification of Transmittal of International Search Report and Written Opinion, (2 pages) mailed Mar. 28, 2012.

(Continued)

*Primary Examiner* — Andrea Wellington
*Assistant Examiner* — Sara Addisu
(74) *Attorney, Agent, or Firm* — Larry R. Meenam, Esq.

(57) ABSTRACT

A cutting insert for use in a chipforming material removal operation that includes a cutting insert body, which has a seating surface, a flank face, and a corner cutting region at the intersection of a peripheral edge and the flank adjacent corresponding corners thereof. The cutting insert body contains a central aperture. The seating surface contains a coolant delivery trough, which has a radial orientation toward a corresponding corner cutting region. The coolant delivery trough has a radial outward end terminating at the peripheral edge and a radial inward end opening into the central aperture. There are a pair of lateral topographic regions wherein the one lateral topographic region is along one side of the coolant delivery trough and the other lateral topographic region is along other side of the coolant delivery trough.

4 Claims, 26 Drawing Sheets

U.S. PATENT DOCUMENTS

| | | | |
|---|---|---|---|
| 3,293,727 A | 12/1966 | Simms | |
| 3,323,195 A | 6/1967 | Vanderjagt | |
| 3,364,800 A | 1/1968 | Benjamin et al. | |
| 3,429,700 A | 2/1969 | Wiegand et al. | |
| 3,486,378 A | 12/1969 | Carlson | |
| 3,571,877 A | 3/1971 | Zerkle | |
| 3,798,725 A | 3/1974 | Hanson | |
| 3,798,726 A | 3/1974 | Dudley | |
| 3,889,520 A | 6/1975 | Stoferle et al. | |
| 3,971,114 A | 7/1976 | Dudley | |
| 4,012,061 A | 3/1977 | Olson | |
| 4,123,194 A | 10/1978 | Cave | |
| 4,204,787 A | 5/1980 | McCray et al. | |
| 4,276,085 A | 6/1981 | Wisell | |
| 4,340,324 A | 7/1982 | McCreery | |
| 4,437,800 A | 3/1984 | Araki et al. | |
| 4,535,216 A | 8/1985 | Cassidenti | |
| 4,579,488 A | 4/1986 | Griffin | |
| 4,621,547 A * | 11/1986 | Yankoff | 82/1.11 |
| 4,682,916 A | 7/1987 | Briese | |
| 4,695,208 A * | 9/1987 | Yankoff | 407/106 |
| 4,757,307 A * | 7/1988 | Keramati et al. | 340/680 |
| 4,813,831 A | 3/1989 | Reinauer | |
| 4,848,198 A | 7/1989 | Royal et al. | |
| 4,861,203 A | 8/1989 | Bassett et al. | |
| 4,880,461 A | 11/1989 | Uchida | |
| 4,880,755 A | 11/1989 | Mehrotra | |
| 4,881,431 A | 11/1989 | Bieneck | |
| 4,955,264 A | 9/1990 | Armbrust | |
| 5,024,976 A | 6/1991 | Mehrotra et al. | |
| 5,148,728 A | 9/1992 | Mazurkiewicz | |
| 5,163,790 A | 11/1992 | Vig | |
| RE34,180 E | 2/1993 | Nemeth et al. | |
| 5,222,843 A | 6/1993 | Katbi et al. | |
| 5,237,894 A | 8/1993 | Lindeke | |
| 5,252,119 A | 10/1993 | Nishida et al. | |
| 5,265,985 A | 11/1993 | Boppana et al. | |
| 5,275,633 A | 1/1994 | Johansson et al. | |
| 5,288,186 A | 2/1994 | Kovacevic | |
| 5,290,135 A | 3/1994 | Ball et al. | |
| 5,316,323 A | 5/1994 | Jovanovic | |
| 5,333,520 A | 8/1994 | Fischer et al. | |
| 5,340,242 A * | 8/1994 | Armbrust et al. | 407/11 |
| 5,346,335 A | 9/1994 | Harpaz et al. | |
| 5,388,487 A | 2/1995 | Danielsen | |
| 5,439,327 A | 8/1995 | Wertheim | |
| D363,076 S | 10/1995 | Hansson et al. | |
| D364,178 S | 11/1995 | Hansson et al. | |
| D369,362 S | 4/1996 | Pantzar et al. | |
| 5,516,242 A | 5/1996 | Andronica | |
| 5,525,134 A | 6/1996 | Mehrotra | |
| 5,542,792 A | 8/1996 | Krueger et al. | |
| 5,554,338 A | 9/1996 | Sugihara et al. | |
| 5,565,156 A | 10/1996 | Ingelstrom | |
| 5,584,616 A * | 12/1996 | Katbi et al. | 407/114 |
| 5,707,185 A | 1/1998 | Mizutani | |
| 5,709,508 A | 1/1998 | Barazani et al. | |
| 5,718,156 A | 2/1998 | Lagrolet et al. | |
| 5,733,075 A | 3/1998 | Basteck | |
| 5,738,468 A | 4/1998 | Boianjiu | |
| 5,761,974 A | 6/1998 | Wang et al. | |
| 5,775,854 A | 7/1998 | Wertheim | |
| 5,799,553 A * | 9/1998 | Billatos | 82/1.11 |
| 5,816,753 A | 10/1998 | Hall | |
| 5,826,469 A | 10/1998 | Haradem | |
| 5,829,331 A | 11/1998 | Mori | |
| 5,901,623 A | 5/1999 | Hong | |
| 5,904,452 A | 5/1999 | Kress | |
| 5,955,186 A | 9/1999 | Grab | |
| 5,975,817 A | 11/1999 | Komine | |
| 6,010,283 A | 1/2000 | Heinrich et al. | |
| 6,045,300 A | 4/2000 | Antoun | |
| 6,050,752 A * | 4/2000 | DeRoche | 407/114 |
| 6,050,756 A | 4/2000 | Bucholz et al. | |
| 6,053,669 A | 4/2000 | Lageberg | |
| 6,056,486 A | 5/2000 | Colvin | |
| 6,117,533 A | 9/2000 | Inspektor | |
| 6,124,040 A | 9/2000 | Kolaska et al. | |
| 6,164,169 A | 12/2000 | Goff | |
| 6,287,058 B1 | 9/2001 | Arai et al. | |
| 6,287,682 B1 | 9/2001 | Grab et al. | |
| 6,299,388 B1 | 10/2001 | Slabe | |
| 6,302,004 B1 | 10/2001 | Taylor | |
| 6,312,199 B1 | 11/2001 | Sjoden et al. | |
| 6,322,746 B1 | 11/2001 | LaSalle et al. | |
| 6,350,510 B1 | 2/2002 | Konig et al. | |
| 6,394,709 B1 | 5/2002 | Sjoo et al. | |
| 6,443,672 B1 | 9/2002 | Lagerberg | |
| 6,447,218 B1 | 9/2002 | Lagerberg | |
| 6,447,890 B1 | 9/2002 | Leverenz et al. | |
| 6,450,738 B1 | 9/2002 | Ripley | |
| 6,471,448 B1 | 10/2002 | Lagerberg | |
| 6,521,349 B1 | 2/2003 | Konig et al. | |
| 6,528,171 B1 | 3/2003 | Endler et al. | |
| 6,551,551 B1 | 4/2003 | Gegel et al. | |
| 6,575,672 B1 | 6/2003 | Maier | |
| 6,595,727 B2 | 7/2003 | Arvidsson | |
| 6,634,835 B1 | 10/2003 | Smith | |
| 6,637,984 B2 | 10/2003 | Murakawa et al. | |
| 6,648,565 B2 | 11/2003 | Schweizer | |
| 6,652,200 B2 | 11/2003 | Kraemer | |
| 6,705,805 B2 | 3/2004 | Lagerberg | |
| 6,708,590 B2 | 3/2004 | Lagerberg | |
| 6,769,335 B2 | 8/2004 | Kaminski | |
| D496,950 S | 10/2004 | Waggle et al. | |
| D497,923 S | 11/2004 | Waggle et al. | |
| 6,860,172 B2 | 3/2005 | Hecht | |
| 6,884,499 B2 | 4/2005 | Penich et al. | |
| 6,905,992 B2 | 6/2005 | Mehrotra | |
| 6,913,428 B2 | 7/2005 | Kress et al. | |
| 6,957,933 B2 | 10/2005 | Pachao-Morbitzer et al. | |
| 6,988,858 B2 | 1/2006 | Gates, Jr. et al. | |
| 6,998,173 B2 | 2/2006 | Liu et al. | |
| 7,094,717 B2 | 8/2006 | Yeckley | |
| 7,125,205 B2 | 10/2006 | Sheffler | |
| 7,125,207 B2 | 10/2006 | Craig et al. | |
| D535,312 S | 1/2007 | Simpson, III | |
| 7,160,062 B2 | 1/2007 | Tran | |
| 7,252,024 B2 | 8/2007 | Zurecki et al. | |
| 7,273,331 B2 | 9/2007 | Giannetti | |
| 7,275,896 B2 * | 10/2007 | Nudelman | 407/114 |
| D555,684 S | 11/2007 | Waggle et al. | |
| 7,309,466 B2 | 12/2007 | Heinrich et al. | |
| 7,396,191 B2 | 7/2008 | Fujimoto et al. | |
| 7,407,348 B2 | 8/2008 | Sjogren et al. | |
| 7,510,352 B2 | 3/2009 | Craig | |
| 7,530,769 B2 | 5/2009 | Kress et al. | |
| 7,568,864 B2 * | 8/2009 | Sjöö | 407/110 |
| 7,611,310 B2 * | 11/2009 | Isaksson | 407/11 |
| 7,621,700 B2 | 11/2009 | Jonsson et al. | |
| 7,634,957 B2 | 12/2009 | Ghosh et al. | |
| 7,637,187 B2 * | 12/2009 | Zurecki et al. | 82/1.11 |
| 7,641,422 B2 | 1/2010 | Berminge et al. | |
| 7,665,933 B2 * | 2/2010 | Nagaya et al. | 407/116 |
| 7,687,156 B2 | 3/2010 | Fang et al. | |
| 7,883,299 B2 | 2/2011 | Prichard et al. | |
| 7,883,300 B1 | 2/2011 | Simpson, III et al. | |
| 7,909,546 B2 | 3/2011 | Nada et al. | |
| 7,914,240 B2 * | 3/2011 | Baker et al. | 407/11 |
| 7,934,891 B2 * | 5/2011 | Jonsson et al. | 407/114 |
| 7,955,032 B2 * | 6/2011 | Nelson | 407/113 |
| 7,959,384 B2 * | 6/2011 | Breisch | 407/110 |
| 7,963,729 B2 | 6/2011 | Prichard et al. | |
| 7,997,832 B2 | 8/2011 | Prichard et al. | |
| 8,047,748 B2 * | 11/2011 | Endres | 407/113 |
| 8,057,130 B2 | 11/2011 | Prichard et al. | |
| 8,057,132 B2 * | 11/2011 | Johansson et al. | 407/113 |
| 8,061,241 B2 * | 11/2011 | Rozzi et al. | 82/46 |
| 8,079,783 B2 | 12/2011 | Prichard et al. | |
| 8,092,123 B2 * | 1/2012 | Prichard et al. | 407/11 |
| 8,137,034 B2 * | 3/2012 | Noureddine | 407/11 |
| 8,202,025 B2 * | 6/2012 | Prichard et al. | 407/11 |
| 8,215,878 B2 * | 7/2012 | Rozzi et al. | 407/11 |
| 8,256,998 B2 | 9/2012 | Prichard et al. | |
| 8,256,999 B2 | 9/2012 | Prichard et al. | |
| 8,277,150 B2 | 10/2012 | Watanabe et al. | |
| 2001/0007215 A1 | 7/2001 | Murata et al. | |

| | | | | |
|---|---|---|---|---|
| 2001/0014259 A1* | 8/2001 | Inayama ............... 407/116 | | |
| 2002/0106250 A1 | 8/2002 | Murakawa et al. | | |
| 2002/0189413 A1* | 12/2002 | Zurecki et al. ............ 82/1.11 | | |
| 2003/0017014 A1 | 1/2003 | Morgulis et al. | | |
| 2003/0082018 A1 | 5/2003 | Kraemer | | |
| 2003/0095841 A1 | 5/2003 | Kraemer | | |
| 2004/0240949 A1 | 12/2004 | Pachao-Morbitzer et al. | | |
| 2005/0186039 A1 | 8/2005 | Muller et al. | | |
| 2006/0053987 A1* | 3/2006 | Ghosh et al. ............... 82/1.11 | | |
| 2006/0140728 A1 | 6/2006 | Giannetti | | |
| 2006/0171837 A1 | 8/2006 | Heinrich et al. | | |
| 2006/0263153 A1 | 11/2006 | Isaksson | | |
| 2007/0160432 A1* | 7/2007 | Eder et al. ............... 407/113 | | |
| 2007/0283794 A1* | 12/2007 | Giannetti ............... 82/158 | | |
| 2007/0286689 A1* | 12/2007 | Giannetti ............... 407/11 | | |
| 2008/0175676 A1 | 7/2008 | Prichard | | |
| 2008/0175677 A1 | 7/2008 | Prichard et al. | | |
| 2008/0175678 A1 | 7/2008 | Prichard | | |
| 2008/0175679 A1 | 7/2008 | Prichard | | |
| 2008/0199263 A1* | 8/2008 | Jonsson et al. ............... 407/11 | | |
| 2010/0254772 A1* | 10/2010 | Rozzi et al. ............... 407/11 | | |
| 2011/0027024 A1* | 2/2011 | Prichard et al. ............... 407/11 | | |
| 2011/0070037 A1* | 3/2011 | Baker et al. ............... 407/11 | | |
| 2011/0299944 A1* | 12/2011 | Hofermann ............... 407/11 | | |
| 2011/0305531 A1* | 12/2011 | Amstibovitsky et al. ...... 407/11 | | |
| 2011/0311323 A1* | 12/2011 | Hecht ............... 407/11 | | |
| 2012/0087747 A1* | 4/2012 | Fang et al. ............... 407/11 | | |
| 2012/0230780 A1* | 9/2012 | Henry et al. ............... 407/11 | | |

FOREIGN PATENT DOCUMENTS

| | | | |
|---|---|---|---|
| DE | 3740814 A1 | 12/1987 | |
| EP | 100376 A2 | 2/1984 | |
| EP | 0599393 B1 | 2/1996 | |
| EP | 791420 A1 * | 8/1997 | |
| EP | 0932460 B1 | 6/2003 | |
| FR | 1279749 | 1/1961 | |
| FR | 2244590 | 9/1973 | |
| JP | 5669007 A2 | 6/1981 | |
| JP | 60127904 A | 7/1985 | |
| JP | 04183503 A2 | 6/1992 | |
| JP | 05301104 | 11/1993 | |
| JP | 06254704 A * | 9/1994 | |
| JP | 06083205 U | 11/1994 | |
| JP | 07227702 A2 | 8/1995 | |
| JP | 07237006 | 9/1995 | |
| JP | 08025111 A | 1/1996 | |
| JP | 08039387 | 2/1996 | |
| JP | 08039387 A | 2/1996 | |
| JP | 09262706 A | 10/1997 | |
| JP | 10094904 A2 | 4/1998 | |
| JP | 2000280106 A | 10/2000 | |
| JP | 2001113408 A | 4/2001 | |
| JP | 2001239420 A | 9/2001 | |
| JP | 2001287103 A * | 10/2001 | |
| JP | 2002346810 A * | 12/2002 | |
| JP | 2003053622 A | 2/2003 | |
| JP | 2003266207 A2 | 9/2003 | |
| JP | 2003266208 A2 | 9/2003 | |
| JP | 2004122262 A | 4/2004 | |
| JP | 2005279900 A2 | 10/2005 | |
| JP | 06136953 A | 6/2006 | |
| JP | 2007044834 A * | 2/2007 | |
| KR | 1020060027154 A | 3/2006 | |
| KR | 1020060054916 A | 5/2006 | |
| KR | 1020090094250 | 9/2009 | |
| SU | 1217585 A * | 3/1986 | |
| WO | 9830349 A1 | 7/1998 | |
| WO | 0076697 A2 | 12/2000 | |
| WO | 0158632 A1 | 8/2001 | |
| WO | WO 2010079472 A1 * | 7/2010 | |
| WO | 2010096014 A1 | 8/2010 | |

OTHER PUBLICATIONS

PCT/US2011/046985 International Search Report, (3 pages) mailed Mar. 28, 2012.

PCT/US2011/046985 Written Opinion, (5 pages) mailed Mar. 28, 2012.

A.S.T.M. Tool Engineers Handbook McGraw Hill Book Co. New York, NY (1949) pp. 302-315.

Moltrecht, K.H. Machine Shop Practice, Industrial Press Inc. New York, NY (1981) pp. 199-204.

Santhanam et al. "Cemented Carbides", Metals Handbook, vol. 2, 10th Edition, Properties and Selection, ASM International (1990) pp. 950-977.

Wertheim et al., "Influence of High-Pressure Flushing through the Rake Face of a Cutting Tool", Annuals of the CIRP, vol. 41/1 (1992) pp. 101-106.

* cited by examiner

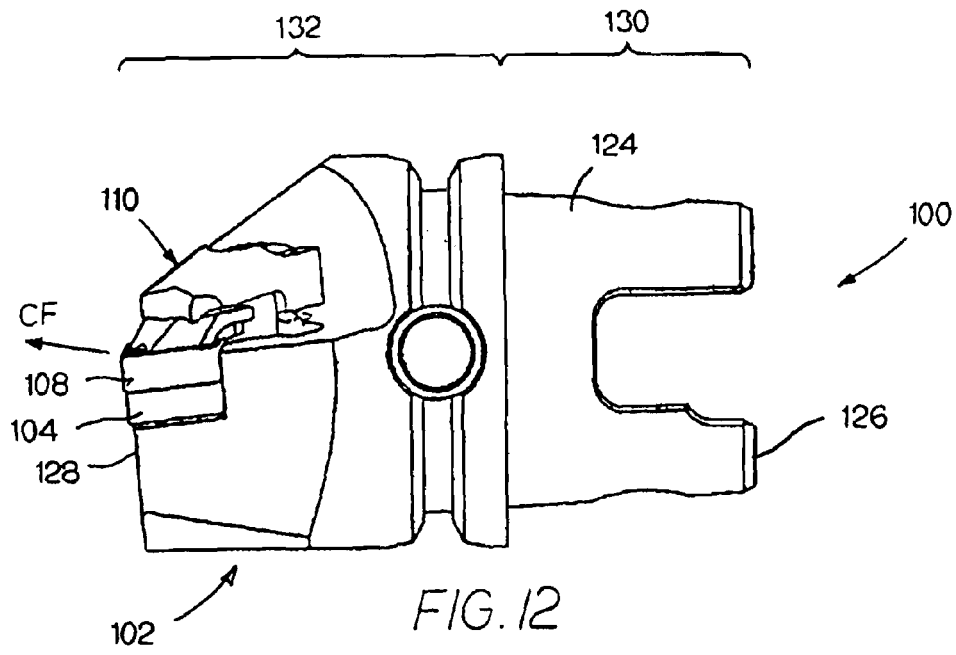
FIG. 12
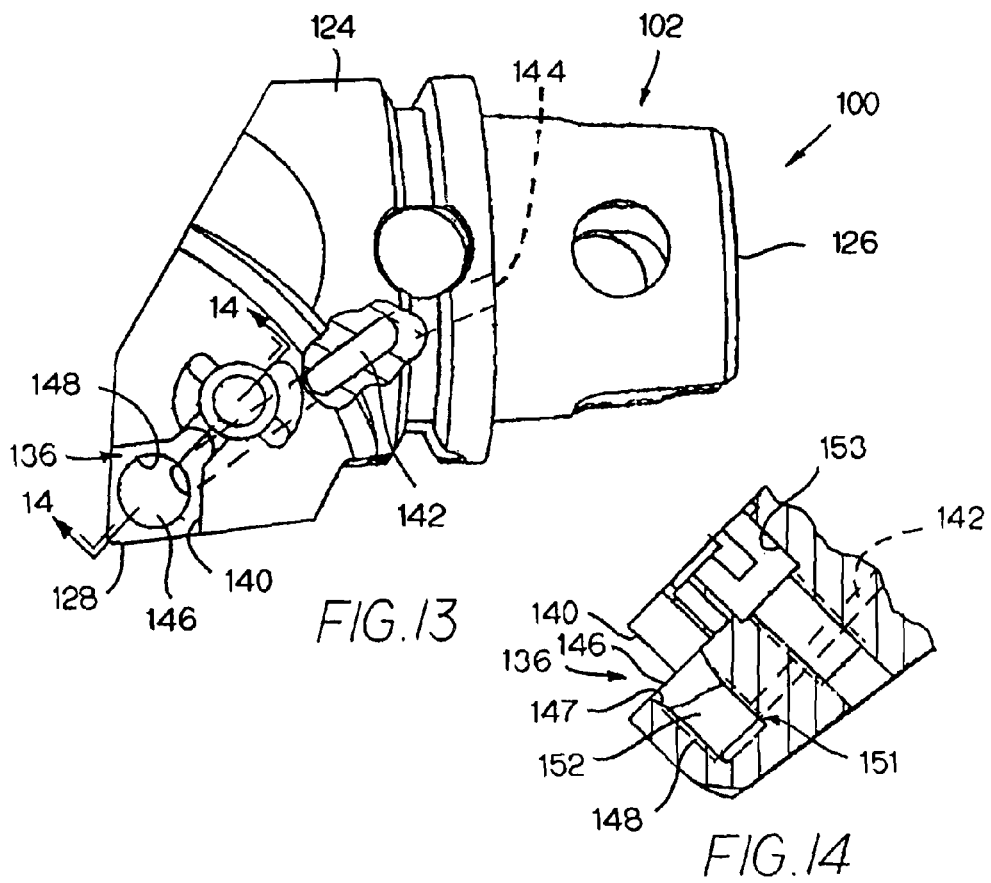
FIG. 13
FIG. 14

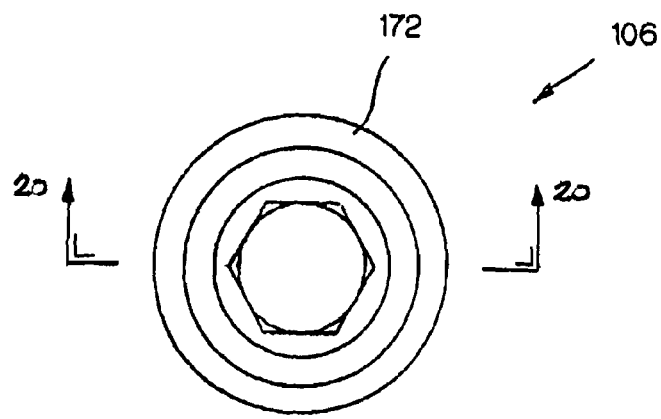
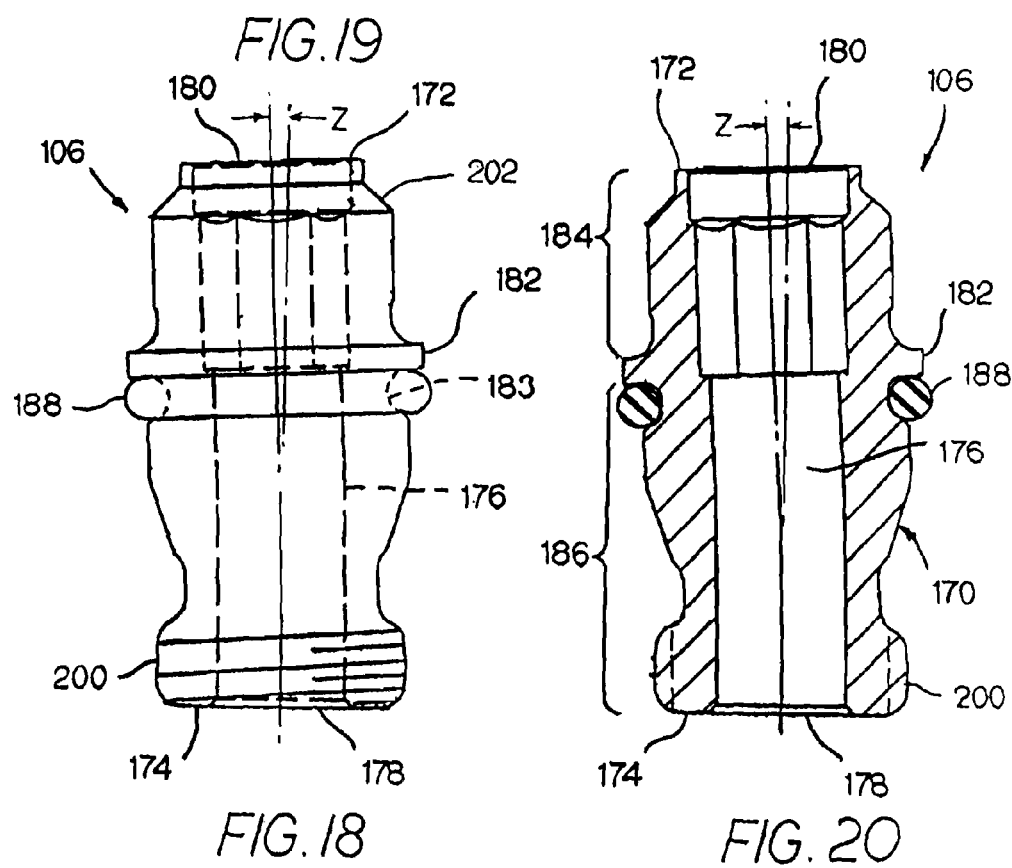

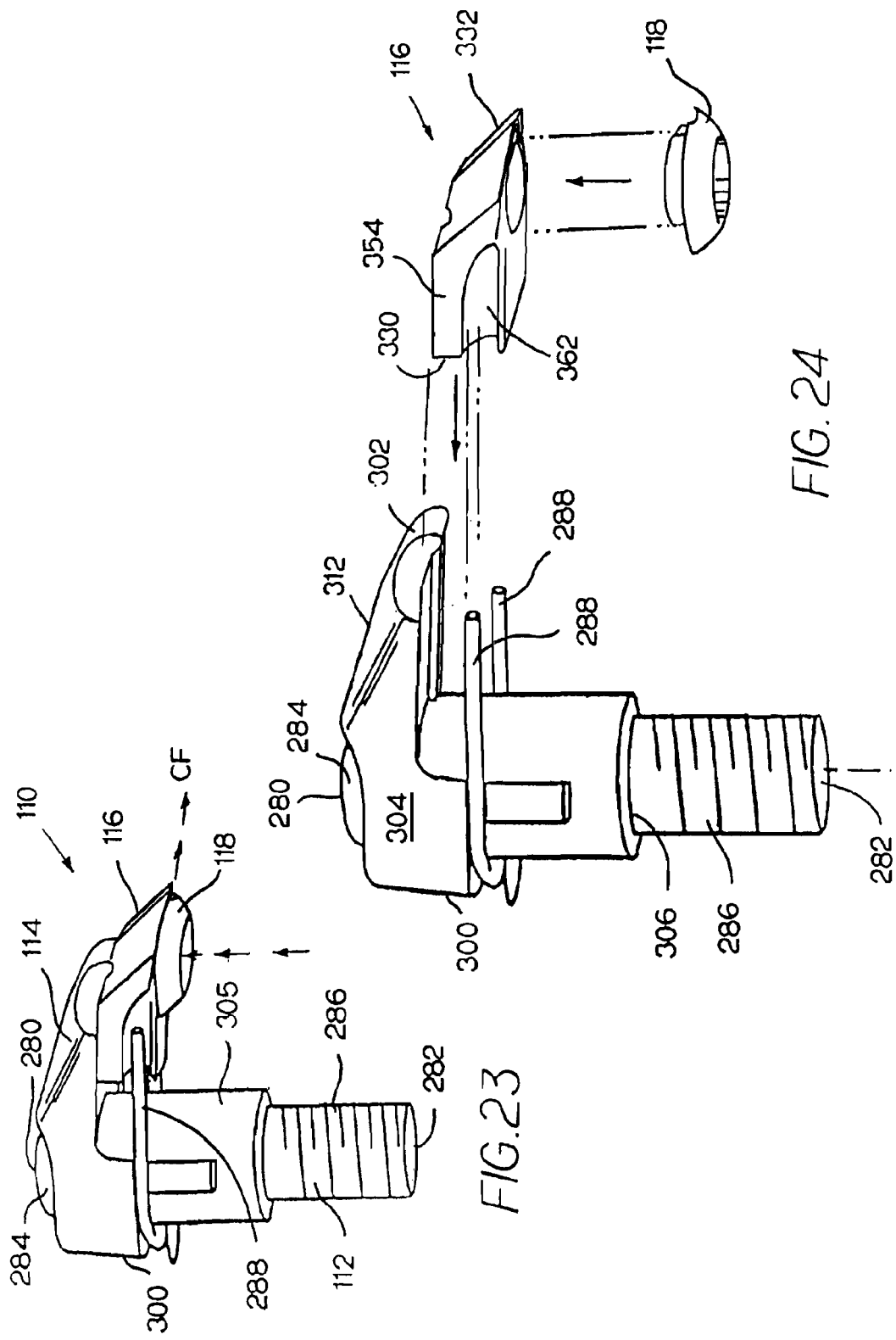

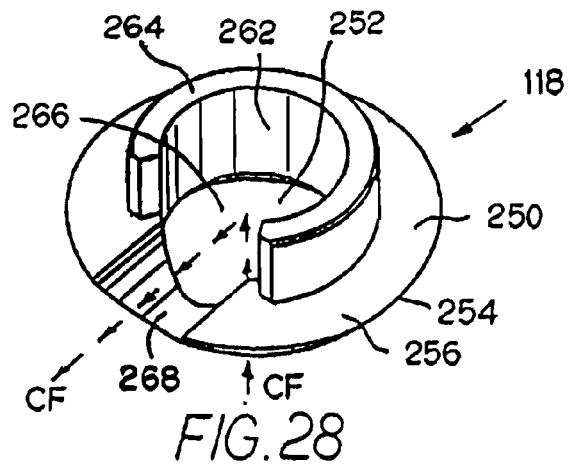
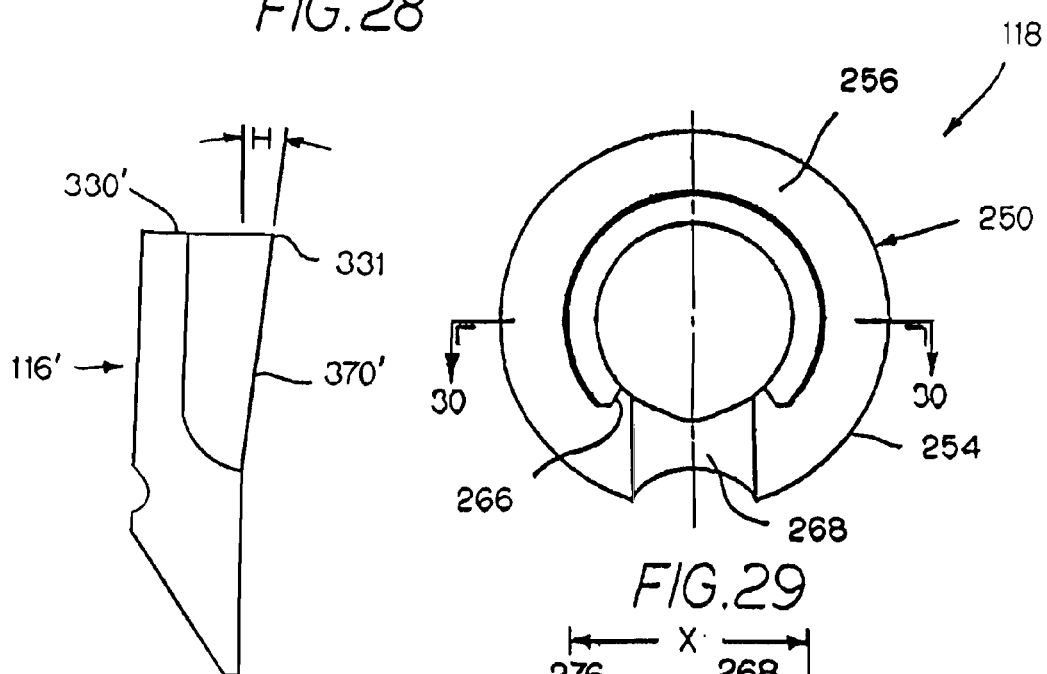
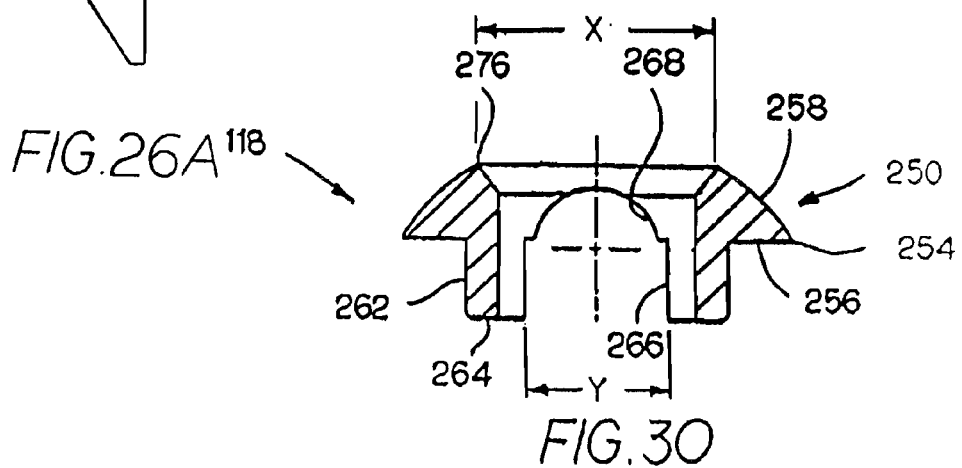

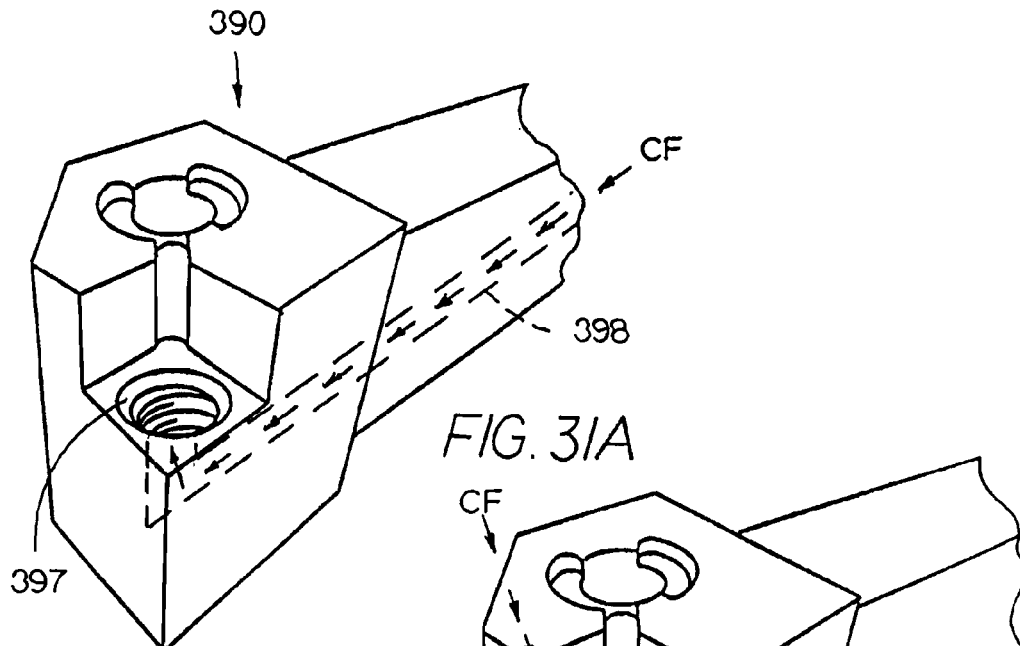
FIG. 31A
FIG. 31B
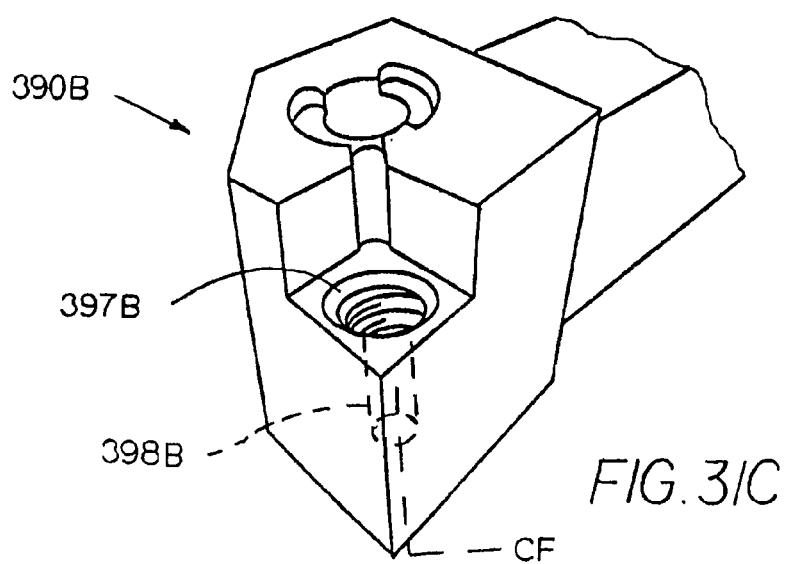
FIG. 31C

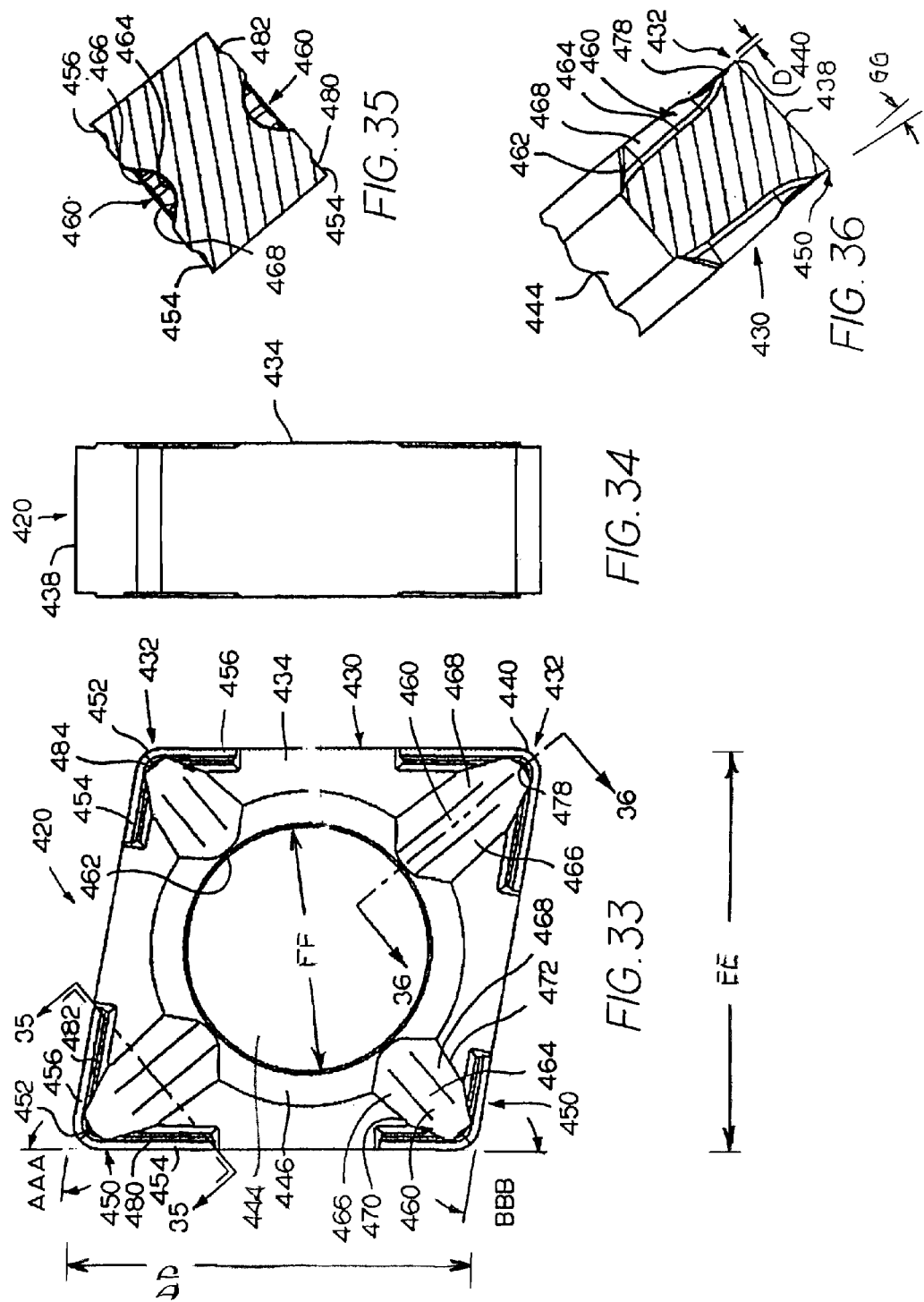

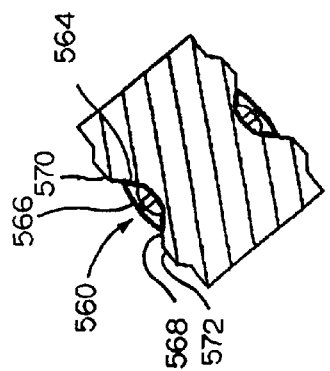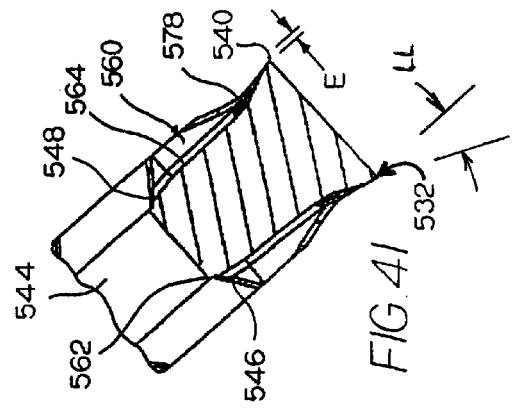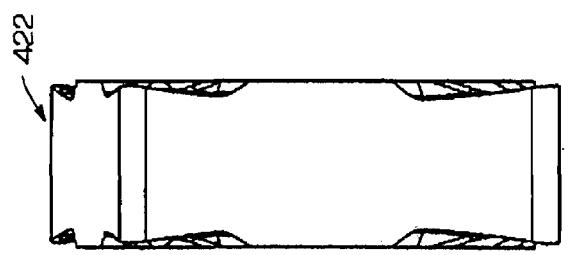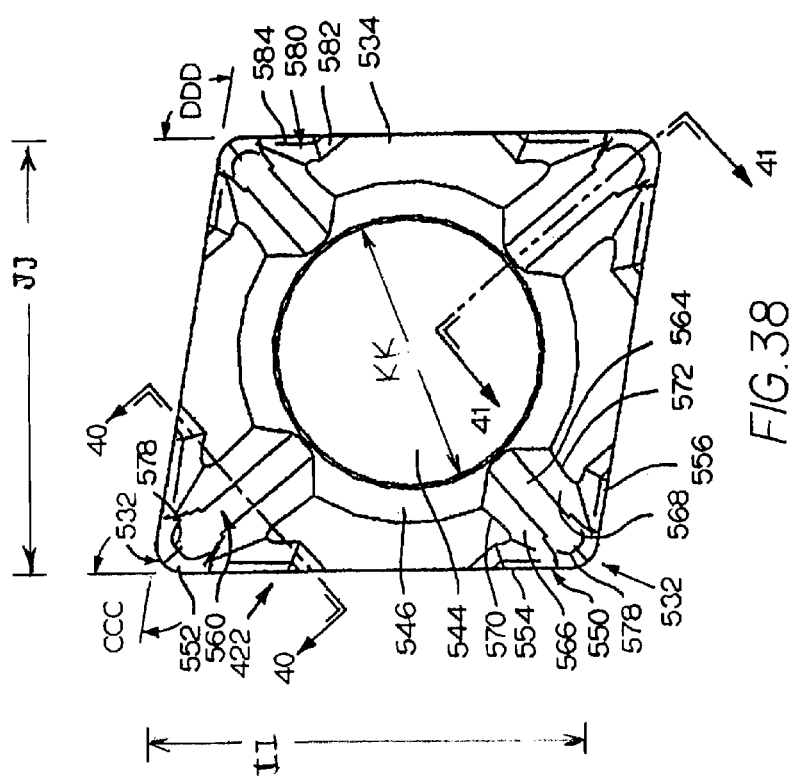

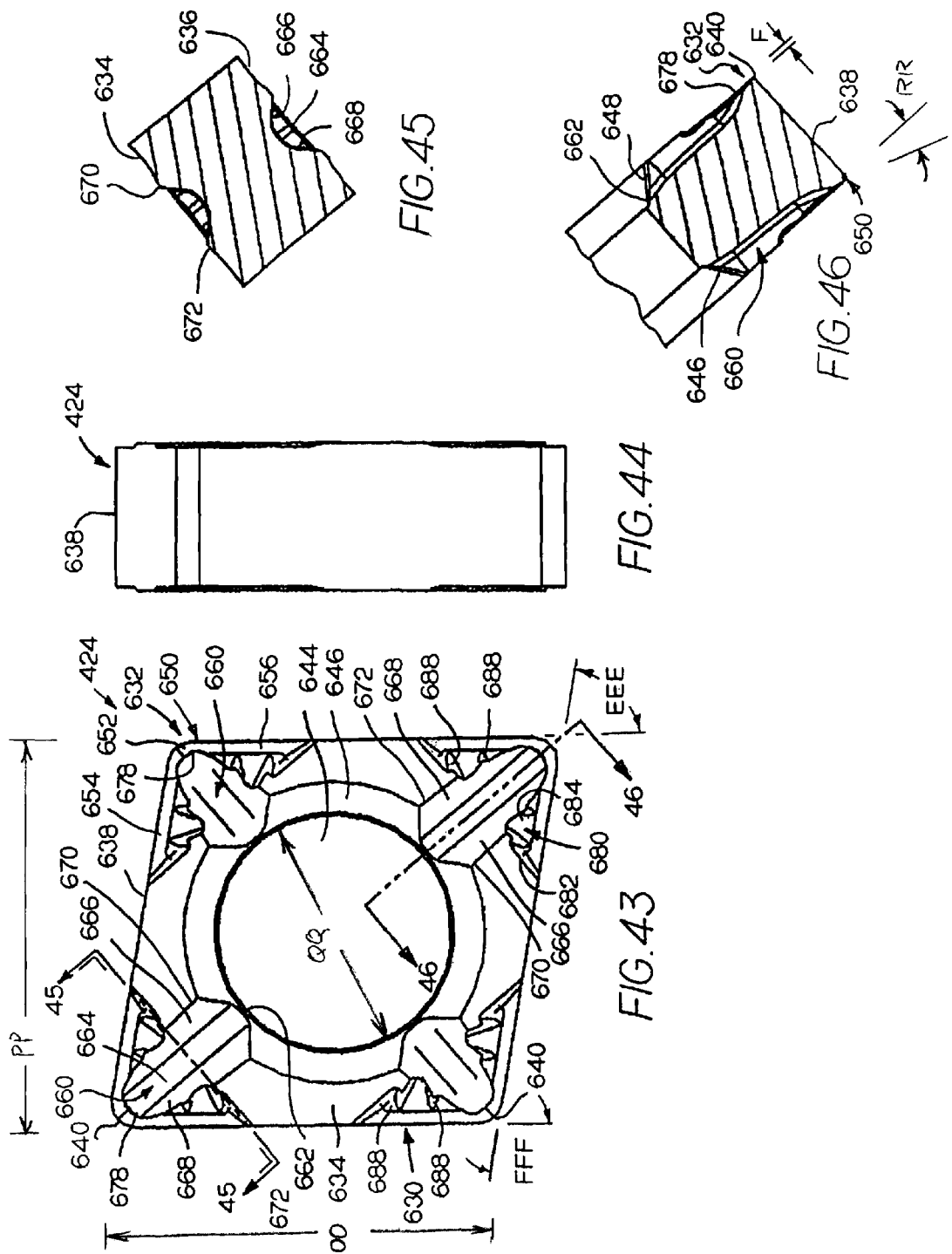

CUTTING INSERTS

CROSS-REFERENCE TO EARLIER PATENT APPLICATIONS

This patent applications is a continuation-in-part of pending U.S. patent application Ser. No. 12/874,591 filed on Sep. 2, 2010 by Shi Chen et al. for CUTTING INSERT ASSEMBLY AND COMPONENTS THEREOF, which is a continuation-in-part of Ser. No. 11/654,918 filed on Jan. 18, 2007 by Paul D. Prichard et al. for METALCUTTING SYSTEM FOR EFFECTIVE COOLANT DELIVERY.

Applicants hereby claim priority based upon said U.S. patent application Ser. No. 12/874,591 filed on Sep. 2, 2010 by Chen et al. Further, applicants hereby incorporate herein in its entirety such U.S. patent application Ser. No. 12/874,591 filed on Sep. 2, 2010.

BACKGROUND OF THE INVENTION

The subject invention pertains to a metal cutting system and, in particular, to a metal cutting system adapted to facilitate enhanced delivery of coolant adjacent the interface between the cutting insert and the workpiece (i.e., the insert-chip interface) to diminish excessive heat at the insert-chip interface in the chipforming removal of material from a workpiece. The subject invention is directed further to components of such metal cutting systems. Such components include, for example, a locking pin, a clamp assembly, a holder, a shim and especially the cutting insert.

Metal cutting tools for performing metal working operations generally comprise a cutting insert having a surface terminating at a cutting edge and a tool holder formed with a seat adapted to receive the insert. The cutting insert engages a workpiece to remove material, and in the process forms chips of the material. Excessive heat at the insert-chip interface can negatively impact upon (i.e., reduce or shorten) the useful tool life of the cutting insert.

For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material.

As another example, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut.

There is an appreciation that a shorter useful tool life increases operating costs and decreases overall production efficiency. Excessive heat at the insert-chip interface contribute to the welding of chip material and re-cutting of chips, both of which are detrimental to production efficiency. There are readily apparent advantages connected with decreasing the heat at the insert-chip interface wherein one way to decrease the temperature is to supply coolant to the insert-chip interface.

Heretofore, systems operate to lower the cutting insert temperature during cutting. For example, some systems use external nozzles to direct coolant at the cutting edge of the insert. The coolant serves not only to lower the temperature of the insert but also to remove the chip from the cutting area. The nozzles are often a distance of one to twelve inches away from the cutting edge. This is too far of a distance for effective cooling. The farther the coolant must travel, the more the coolant will mix with air and the less likely it will be to contact the tool-chip interface.

U.S. Pat. No. 6,053,669 to Lagerberg for CHIP FORMING CUTTING INSERT WITH INTERNAL COOLING discusses the importance of reducing the heat at the insert-chip interface. Lagerberg mentions that when the cutting insert is made from cemented carbide reaches a certain temperature, its resistance to plastic deformation decreases. A decrease in plastic deformation resistance increases the risk for breakage of the cutting insert. U.S. Pat. No. 5,775,854 to Wertheim for METAL CUTTING TOOL points out that a rise in the working temperature leads to a decrease in hardness of the cutting insert. The consequence is an increase in wear of the cutting insert.

Other patent documents disclose various ways to or systems to deliver coolant to the insert-chip interface. For example, U.S. Pat. No. 7,625,157 to Prichard et al. for MILLING CUTTER AND MILLING INSERT WITH COOLANT DELIVERY pertains to a cutting insert that includes a cutting body with a central coolant inlet. The cutting insert further includes a positionable diverter. The diverter has a coolant trough, which diverts coolant to a specific cutting location.

U.S. Pat. No. 6,045,300 to Antoun for TOOL HOLDER WITH INTEGRAL COOLANT PASSAGE AND REPLACEABLE NOZZLE discloses using high pressure and high volume delivery of coolant to address heat at the insert-chip interface. U.S. Pat. No. 6,652,200 to Kraemer for a TOOL HOLDER WITH COOLANT SYSTEM discloses grooves between the cutting insert and a top plate. Coolant flows through the grooves to address the heat at the insert-chip interface. U.S. Pat. No. 5,901,623 to Hong for CRYOGENIC MACHINING discloses a coolant delivery system for applying liquid nitrogen to the insert-chip interface.

SUMMARY OF THE INVENTION

The inventor(s) have recognized the problems associated with conventional cooling apparatus and have developed an insert assembly that works with a conventional coolant system to deliver coolant to a cutting insert that addresses the problems of the prior art.

In one form thereof, the invention is a roughing cutting insert for use in a chipforming material removal operation. The cutting insert comprises a cutting insert body that has a seating surface and a flank face and a corner cutting region at the intersection of a peripheral edge and the flank adjacent corresponding corners thereof. The cutting insert body contains a central aperture. The seating surface contains a coolant delivery trough that has a radial orientation toward a corresponding corner cutting region. The coolant delivery trough has a radial outward end terminating at the peripheral edge and a radial inward end opening into the central aperture. The cutting insert body has a pair of lateral topographic regions wherein the one lateral topographic region is along one side of the coolant delivery trough and the other lateral topographic region is along other side of the coolant delivery trough, and each one of the topographical regions comprises a peripheral notch.

In still another for thereof, the invention is a medium roughing cutting insert for use in a chipforming material removal operation. The cutting insert comprises a cutting insert body that has a seating surface and a flank face and a corner cutting region at the intersection of a peripheral edge and the flank adjacent corresponding corners thereof. The cutting insert body contains a central aperture. The seating surface contains a coolant delivery trough that has a radial orientation toward a corresponding corner cutting region. The coolant delivery trough has a radial outward end terminating at the peripheral edge and a radial inward end opening into the central aperture. The cutting insert body has a pair of lateral topographic regions wherein the one lateral topographic region is along one side of the coolant delivery trough and the other lateral topographic region is along other side of the coolant delivery trough. Each one of the topographical regions comprises a lateral notch having a forward-facing beveled face and a beveled lateral face being generally parallel to the coolant delivery trough. The beveled lateral face decreases in area from an intersection with the forward-facing beveled face and a termination with the peripheral edge.

In still another form thereof, the invention is a finishing cutting insert for use in a chipforming material removal operation. The cutting insert comprises a cutting insert body that has a seating surface and a flank face and a corner cutting region at the intersection of a peripheral edge and the flank adjacent corresponding corners thereof. The cutting insert body contains a central aperture. The seating surface contains a coolant delivery trough that has a radial orientation toward a corresponding corner cutting region. The coolant delivery trough has a radial outward end terminating at the peripheral edge and a radial inward end opening into the central aperture. The cutting insert body has a pair of lateral topographic regions wherein the one lateral topographic region is along one side of the coolant delivery trough and the other lateral topographic region is along other side of the coolant delivery trough. Each one of the topographical regions comprises a lateral notch having a forward-facing beveled face and a beveled lateral face being generally parallel to the coolant delivery trough, and wherein the beveled lateral face decreases in area from an intersection with the forward-facing beveled face and a termination with the peripheral edge. A plurality of projections are on the beveled lateral face.

A cutting insert for use in a chipforming material removal operation. The cutting insert comprises a cutting insert body that has a seating surface and a flank face and a corner cutting region at the intersection of a peripheral edge and the flank adjacent corresponding corners thereof. The cutting insert body contains a central aperture. The seating surface contains a coolant delivery trough that has a radial orientation toward a corresponding corner cutting region. The coolant delivery trough has a radial outward end terminating at the peripheral edge and a radial inward end opening into the central aperture. The cutting insert body has a pair of lateral topographic regions wherein the one lateral topographic region is along one side of the coolant delivery trough and the other lateral topographic region is along other side of the coolant delivery trough.

BRIEF DESCRIPTION OF THE DRAWINGS

The following is a brief description of the drawings that form a part of this patent application:

FIG. 12 is a side view of the specific embodiment of FIG. 11;

FIG. 13 is a top view of the specific embodiment of FIG. 11 but without the cutting insert assembly affixed to the holder, and with a portion of the holder body removed to show the interior coolant passage;

FIG. 14 is a cross-sectional view of the specific embodiment of FIG. 13, which does not have the cutting insert assembly, taken along section line 14-14 of FIG. 13;

FIG. 18 is a side view of the locking pin;

FIG. 19 is a top view of the locking pin;

FIG. 20 is a cross-sectional view of the locking pin taken along section line 20-20 of FIG. 19;

FIG. 23 is an isometric view of the clamp assembly, which comprises the screw, the clamp arm, the diverter plate and the seal;

FIG. 24 is an isometric view of the clamp assembly wherein the diverter plate is exploded away from the screw-clamp arm assembly, and the seal is exploded away from the diverter plate;

FIG. 26A is a side view of another specific embodiment of the diverter plate;

FIG. 28 is an isometric view of the seal showing the bottom surface thereof;

FIG. 29 is a bottom view of the seal of FIG. 28;

FIG. 30 is a cross-sectional view of the seal of FIG. 29 taken along section line 30-30 of FIG. 29;

FIG. 31A is an isometric view of a holder like that of FIG. 31 with the internal coolant passage entering the holder from the rear and traveling along the elongate shank;

FIG. 31B is an isometric view of a holder like that of FIG. 31 with the internal coolant passage entering the holder from the side and traveling in the head of the holder;

FIG. 31C is an isometric view of a holder like that of FIG. 31 with the internal coolant passage entering the holder from the bottom and traveling in the head of holder;

FIG. 33 is a top view of the cutting insert of FIG. 32;

FIG. 34 is a side view of the cutting insert of FIG. 32;

FIG. 35 is a cross-sectional view of the cutting insert of FIG. 32 taken along section line 35-35 of FIG. 33;

FIG. 36 is a cross-sectional view of the cutting insert of FIG. 32 taken along section line 36-36 of FIG. 33;

FIG. 38 is a top view of the cutting insert of FIG. 37;

FIG. 39 is a side view of the cutting insert of FIG. 37;

FIG. 40 is a cross-sectional view of the cutting insert of FIG. 37 taken along section line 40-40 of FIG. 38;

FIG. 41 is a cross-sectional view of the cutting insert of FIG. 37 taken along section line 41-41 of FIG. 38;

FIG. 43 is a top view of the cutting insert of FIG. 42;

FIG. 44 is a side view of the cutting insert of FIG. 42;

FIG. 45 is a cross-sectional view of the cutting insert of FIG. 42 taken along section line 45-45 of FIG. 43; and FIG. 46 is a cross-sectional view of the cutting insert of FIG. 42 taken along section line 46-46 of FIG. 43.

DETAILED DESCRIPTION

The present invention pertains to a cutting insert assembly useful for a chipforming material removal operation, and especially to a cutting insert, which is a part of the above cutting insert assembly. In a chipforming material removal operation, the cutting insert engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . ". Moltrecht goes on to describe formation of a discontinuous chip and a segmented chip. As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Figure 1:
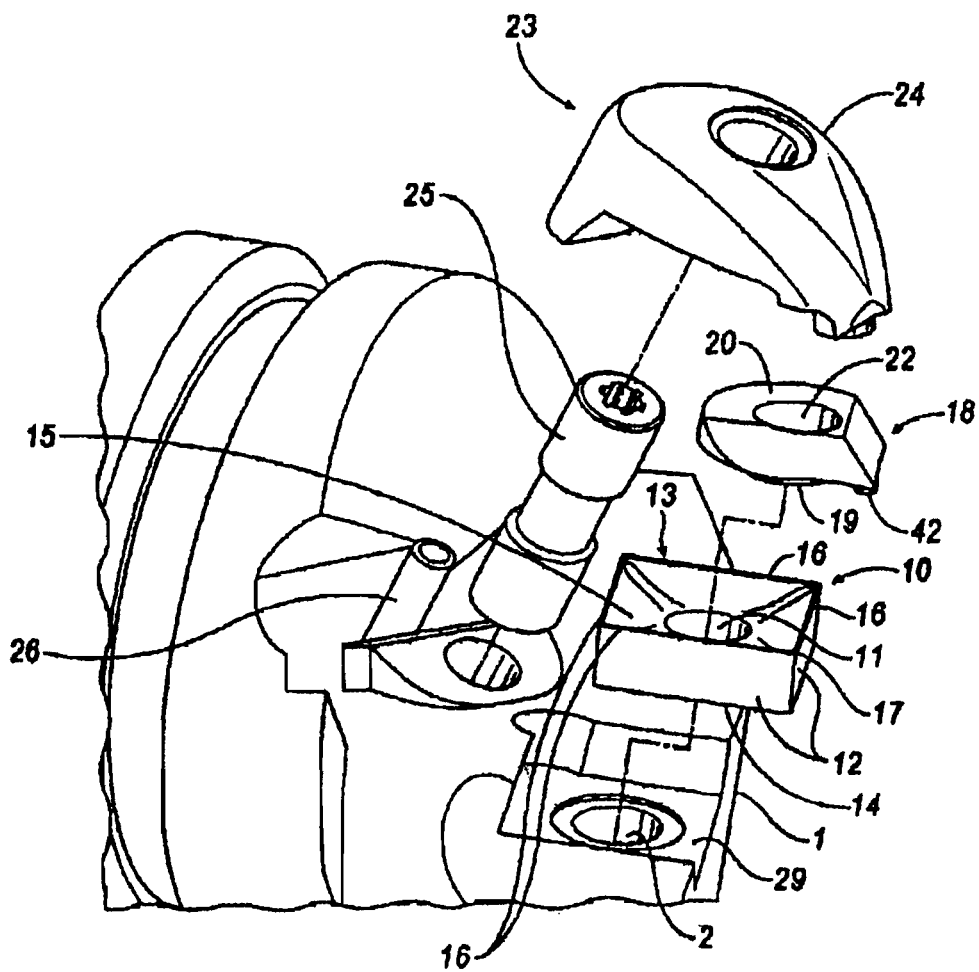
FIG. 1 is an exploded view of the invention with rake face cooling only.

Referring to FIG. 1 of the invention, there is shown a tool holder 1 having a recess 29 for receiving a cutting insert 10. The tool holder 1 also has a coolant passage 2 for delivering fluid coolant to the recess 29. An indexable, cutting insert 10 is positioned in the recess 29. The cutting insert 10 has at least one flank face 12, a rake face 13 and a bottom face 14. The intersection between the flank face 12 and the rake face 13 forms a cutting edge 16. In the instance of a plurality of flank faces, the intersection between two adjacent flank faces 12 and the rake face 13 forms a cutting corner 17. It will be appreciated that a round cutting insert does not include two adjacent flank faces and therefore does not include a cutting corner. Although a round cutting insert does not include a cutting corner it will be appreciated that in any case, a cutting edge is present. An insert depression 15 is located in the rake face 13 of the insert 10. The insert depression 15 is an area within the rake face 13 that is lower than the remaining portion of the rake face 13 surrounding the insert depression 15 and including the cutting edges 16 and as appropriate, cutting corner 17. In one embodiment, the cutting edges 16 and cutting corner all lie within the same plane. It will be apparent that some of the cutting edges may also lie above or below one another in elevation. For example, this would be the case if an elliptically shaped insert with an uneven rake face were used as the insert in the metal cutting system.

The insert 10 has an insert orifice 11 that aligns with the coolant passage 2 of the tool holder 1 to receive coolant. The insert orifice 11 opens to both the rake face 13 and the bottom face 14. A top piece 18 is adjacent to insert 10. The top piece 18 has a clamp side 20 and insert side 19. Insert side 19 of top piece 18 has a shape corresponding to the insert depression 15 such that positioning the two together forms a seal. The top piece also has a reservoir 34 (shown in FIG. 5) in the insert side 19. The reservoir 34 is a pocket in the insert side 19 of the top piece 18 that aligns with the insert orifice 11. The reservoir 34 distributes coolant to the top piece 18. Top piece 18 also has at least one rake face cooling channel 21. The rake face cooling channel 21 is a groove formed in the insert side 19 of the top piece 18 that runs from the reservoir 34 to the point on the top piece 18 nearest the cutting edge 16 or cutting corner 17, as appropriate. See FIG. 5 for a view of the rake face cooling channel 21. When the top piece 18 is seated in the insert depression 15 the rake face cooling channel 21 seals against the insert depression 15 to create a coolant path to cutting edge 16 or cutting corner 17. It is also contemplated that the rake face cooling channel 21 could be formed by a groove in the insert depression 15 which seals against the insert side 19 of the top piece 18. A clamp 23 applies pressure to the top piece depression 22. The clamp 23 maintains the alignment and seal between top piece 18, insert 10 and tool holder 1. It will be appreciated that the type of clamp 23 is not limited to the style shown in the drawings. Rather, the clamp 23 can include any other suitable clamp style of a type well known in the art.

Figure 7:
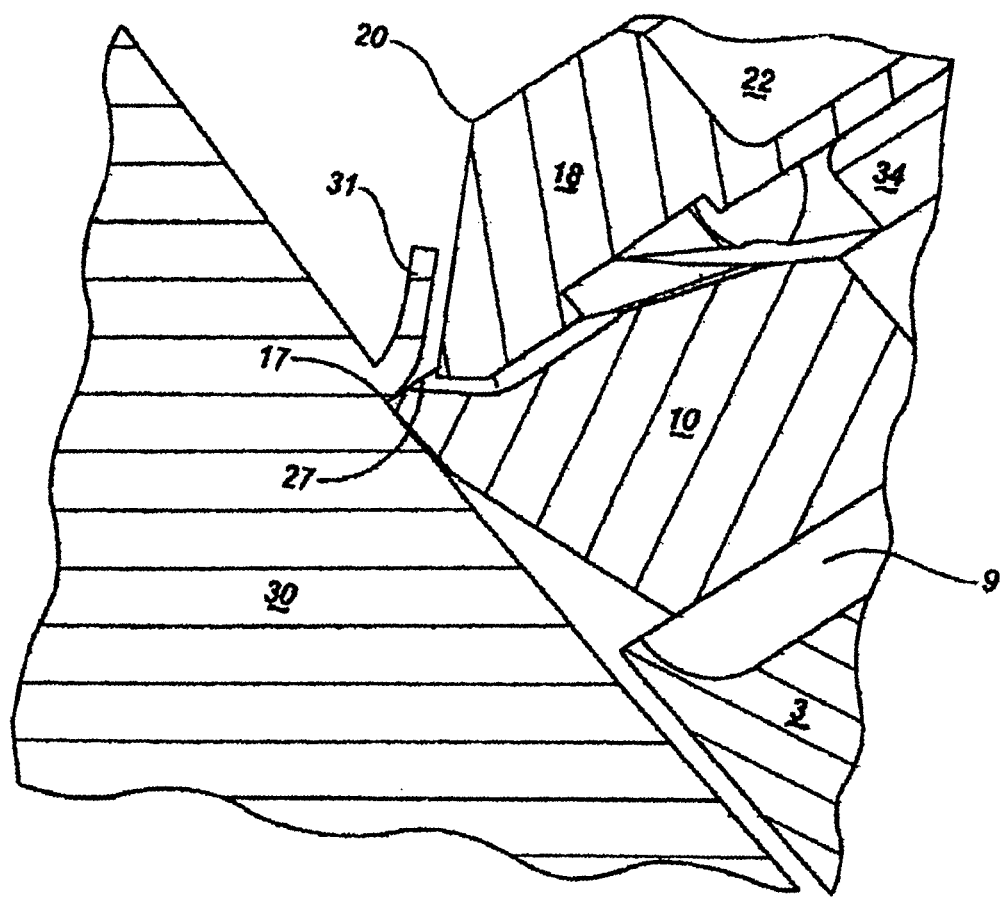
FIG. 7 is a cross-sectional perspective of the invention engaging a workpiece and forming a chip.

As shown in FIG. 7 when the insert 10 engages a workpiece 30 a chip 31 is lifted away from the workpiece at the cutting edge 16 or cutting corner 17. The congruent relationship between the top piece 18 and insert depression 15 creates a rake face coolant cooling channel 21 that directs coolant so that it is delivered from an angle below the intersection at the rake face 13 and the chip 31. This delivery angle causes the coolant to impinge the underside of the chip resulting in improved cooling and chip removal. The rake face cooling channel 21 spans from the reservoir 34 to a point nearest the cutting edge. A primary discharge slot 27 is formed at the end of the rake face cooling channel 21 nearest the cutting edge 16 or cutting corner 17. It is an important aspect of this invention that the primary discharge slot 27 lie below the cutting edge 16 or corner 17. In this description, "below the cutting edge" or "below the cutting corner" in this description means generally towards the recess 29 as opposed to "above the cutting edge" or "above the cutting corner" which would be generally towards the clamp. Cooling and chip removal are most efficient when the primary discharge slot 27 is within about 0.100 inches of the chip.

Figure 2:
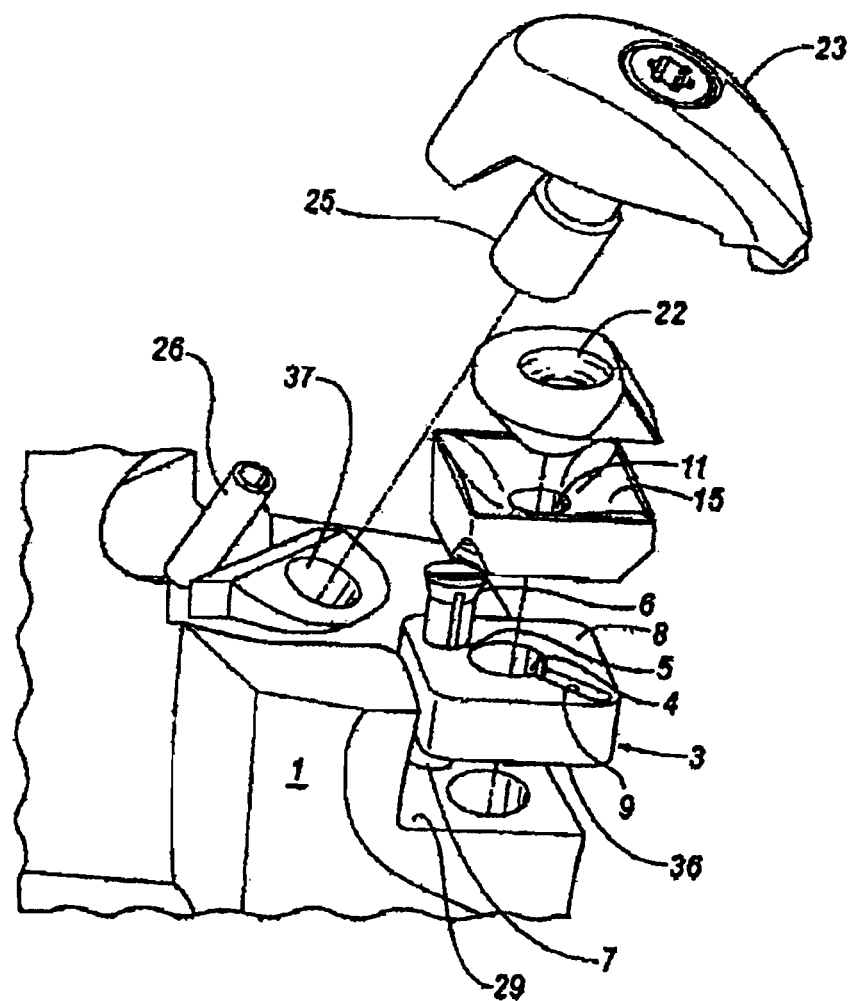
FIG. 2 is an exploded view of the invention with rake and flank cooling.
Figure 5:
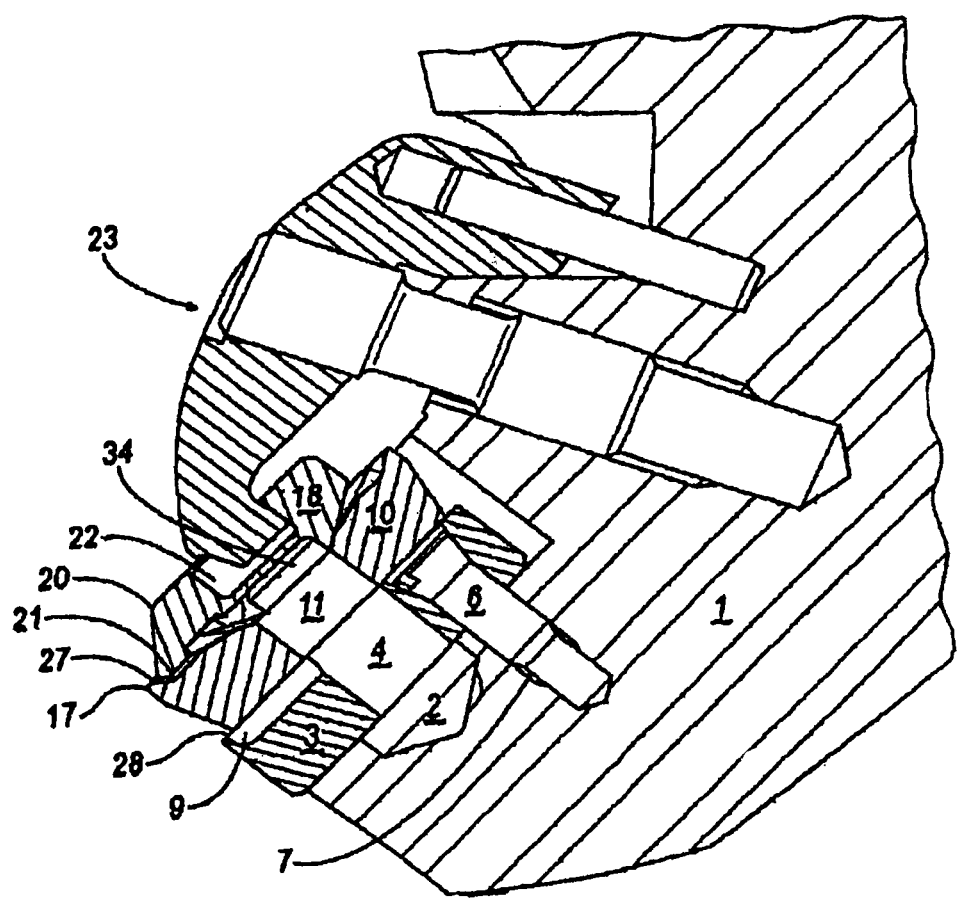
FIG. 5 is a cross section of a perspective view of the invention with rake and flank face cooling.

In another embodiment shown in FIG. 2 and FIG. 5, a shim 3 having a top side 8 and a bottom side 36 is positioned between the tool holder 1 and the insert 10. The shim 3 is oriented so that the bottom side 36 abuts the tool holder 1 and the top side abuts the insert 10. A shim pin 6 is inserted through a shim pin hole 5 and a tool holder pin hole 7. The shim pin 6 maintains the alignment of the shim 3 between the tool holder 1 and insert 10. A shim orifice 4 is formed through the center of the shim 3. The shim orifice 4 provides a path for coolant to pass from the coolant passage 2 of the tool holder 1 to the insert orifice 11. A slot forming a part of flank face cooling channel 9 is provided on the top side 8 of the shim 3. The insert bottom face 14 seals the exposed slot in the top side 8 of shim 3 to create a flank face cooling channel 9. The flank face cooling channel 9 spans from the shim orifice 4 almost to an outer portion of the shim 3 nearest the cutting edge 16 or cutting corner 17. The end of flank face cooling channel 9 nearest the cutting edge has a curved base so that coolant is directed toward the cutting edge 16 or cutting corner 17 or flank face 12 of the insert 10.

In the embodiment as shown, the insert 10 has flank faces 12 and flank edges 32 that taper inward at a shallow angle from the rake face 13 to the bottom face 14. In this manner the width of shim 3 will be less than the width of the insert bottom face 14 and less than the width of the rake face 13. Attention is drawn to the fact that this taper is meant to expose the flank faces 12 and flank edge 16 to coolant. The tapering of the insert 10 allows a portion of the flank face cooling channel 9 to be exposed creating secondary discharge hole 28, thus enabling expulsion of coolant along the flank faces of the insert 10.

Figure 3:
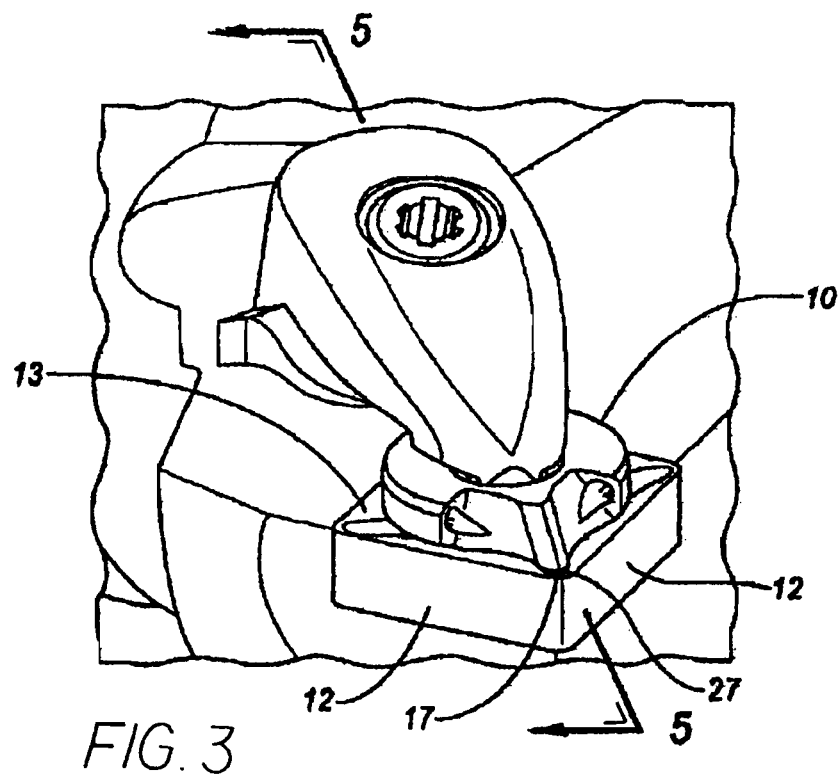
FIG. 3 is a perspective view of the invention with rake face cooling and jets.

A third embodiment shown in FIG. 3 adds jets 33 to the top piece 18. The jets 33 are additional coolant conduits to increase coolant flow rate and effectively direct more fluid to the tool-chip interface. The jets 33 run from the reservoir 34 to a discharge point on the clamp side 20 of the top piece 18 where the coolant can be directed at the tool-chip interface.

Figure 4:
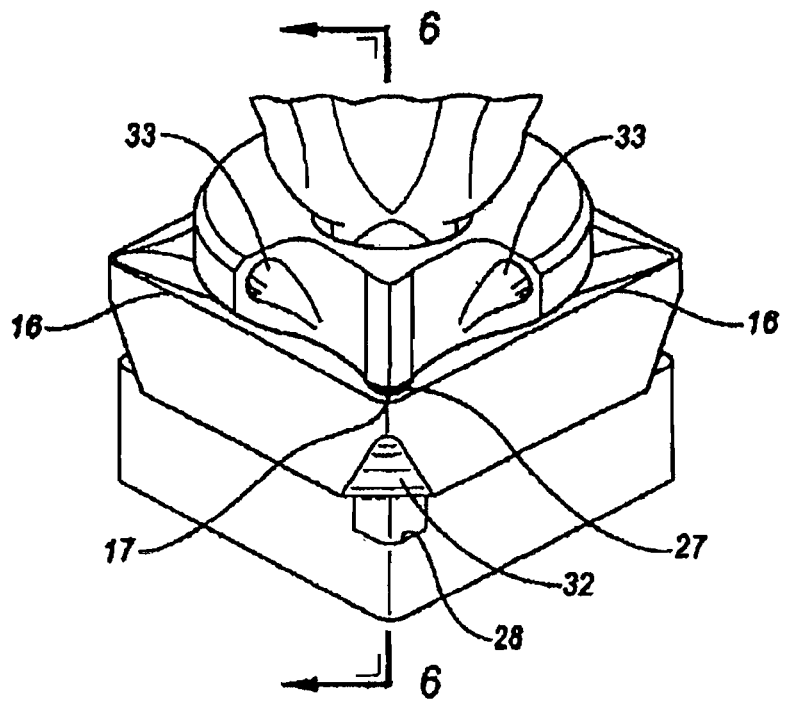
FIG. 4 is a perspective view of the preferred embodiment of the invention with high volume flank cooling, rake face cooling and jets.
Figure 6:
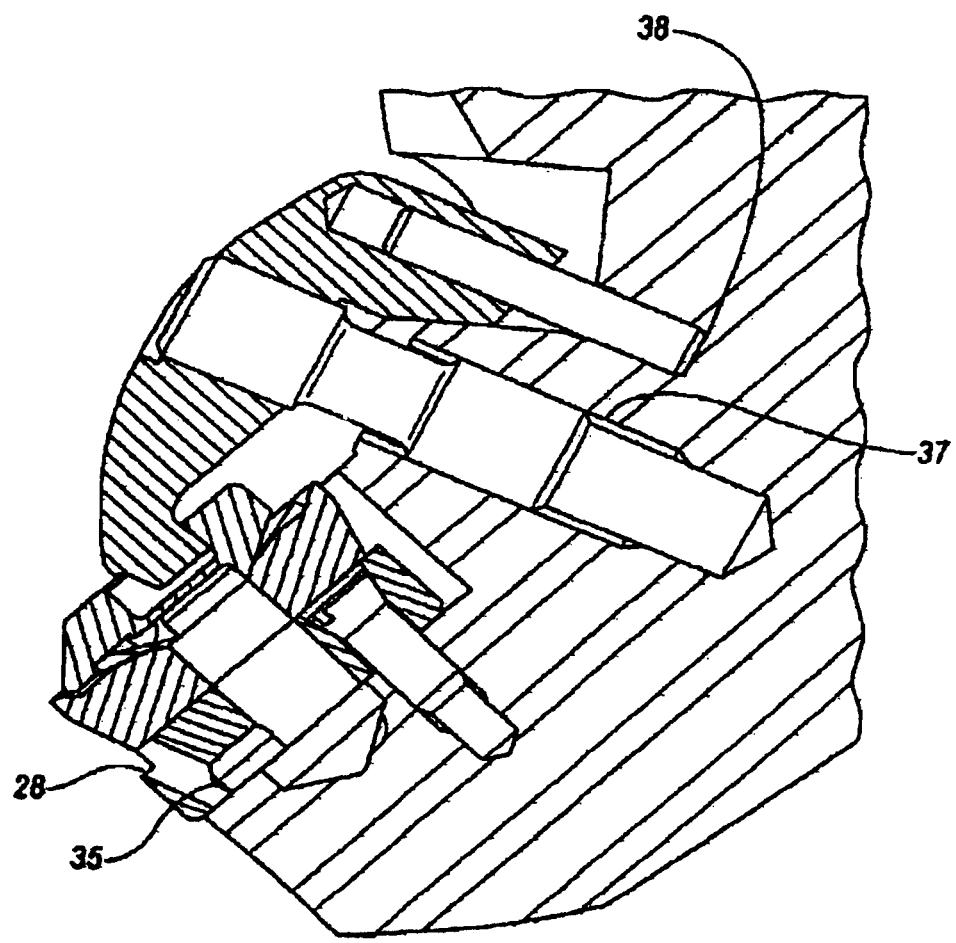
FIG. 6 is a cross section of a perspective view of the invention with rake and high volume flank face cooling.

An alternate embodiment of the invention is shown in FIG. 4 and FIG. 6. In this embodiment, the highest coolant flow rate is achieved providing flank and rake cooling. In this assembly, a shim 3 sits in the recess 29 of tool holder 1 having a tool holder pin hole 7. The shim 3 has a shim orifice 4 and a shim pin hole 5. The shim pin 6 is threaded and extends thorough the shim pin hole 5 in to the tool holder pin hole 7 which is also threaded. This arrangement keeps the shim 3 aligned in relation to the recess 29. A high volume flank cooling channel 35 is formed between the tool holder 1 and shim 3. Part of the high volume flank cooling channel 35 is formed by a groove in the bottom side 36 of the shim 3. This groove could also be formed in the recess 29 of the tool holder 1. The groove is closed by the recess 29 of the tool holder 1 creating a passage for coolant delivery. The high volume flank cooling channel 35 extends partway along the interface between the tool holder 1 and the shim 3 starting at the shim orifice 4 then projects through the body of the shim 3 toward the flank face 12 or flank edge 32 of the insert 10 ending with a secondary discharge hole 28 at a corner of the shim 3 closest to the cutting edge 16 or cutting corner 17 of the insert 10.

The insert 10 has tapered flank faces 12 and flank edges 32 to allow for adequate coolant wash from the secondary discharge hole 28. An insert orifice 11 aligns with the shim orifice 4. The insert bottom face 14 seats against the shim 3 to create a fluid tight seal. The insert depression 15 is frusto-conical and mates to the insert side 19 of the top piece 18 to create a fluid tight seal. The insert side 19 of the top piece 18 is also frusto-conical. The reservoir is located in the central portion of the insert side 19 and is in alignment with the insert orifice 11. The alignment of the reservoir 11, insert orifice 11, shim orifice 4 and coolant passage 2 creates a chamber from which coolant can freely flow to the high volume flank coolant channel 35, rake face cooling channel 21 and jets 33. In a preferred embodiment, the rake face cooling channel 21 runs from the reservoir 34 to within about 0.100 inches of the cutting edge 16 or cutting corner 17. At the end of the rake face cooling channel 21 opposite the reservoir 34 there is a nib 42 on the insert side 19 of the top piece 18. The nib 42 is a bump protruding from the insert side that interferes with the stream of coolant as it exits the primary discharge slot 27. A view of the nib 42 is most clearly shown in FIG. 9. The nib 42 causes the coolant to spray in a wide pattern from the primary discharge slot 27 as opposed to a less desirable concentrated stream that occurs without the nib 42. The rake face cooling channel is sized to be large enough to maximize flow without permitting entry of chips into the channel. Two jets 33 run from the reservoir 34 to exit points on the clamp side 20 that direct the coolant towards the cutting edge 16 or cutting corner 17. A top piece depression 22 is present on the clamp side 20. The clamp 23 has a clamp head 24 that engages the top piece depression 22 to seat the insert 10 and maintain fluid tight seals of all the coolant ducts. In a preferred embodiment, a clamp screw 25 applies pressure to the clamp head 24 in the direction of the top piece 18. A clamp pin 26 maintains alignment of the clamp head 24. It will be appreciated that although a specific clamping assembly is shown in the FIGS. 1-6 and 8, any suitable clamping assembly capable of holding the top piece, insert 10 and shim 3 securely in the recess 29 will suffice. Many of these clamping assemblies are commercially available and well known in the art.

In the preferred embodiment, the total flow of all coolant passages should not be less than 80% of the possible flow from an unrestricted flood nozzle. There should be an appreciation that any one of a number of different kinds of fluid or coolant are suitable for use in the cutting insert. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result they can cause a fluid tendency to foam. In addition, soluble oils can contain oiliness agents such as ester, extreme pressure additives, alkanolamines to provide Òreserve alkalinityÓ a biocide such as triazine or oxazolidene, a defoamer such as a long chain organic fatty alcohol or salt, corrosion inhibitors, antioxidants, etc. Synthetic fluids (chemical fluids) can be further categorized into two subgroups: true solutions and surface active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in this fluids. Semisynthetics fluids (also called semi-chemical) contains a lower amount of refined base oil (5-30%) in the concentrate. They are additionally mixed with emulsifiers, as well as 30-50% of water. Since they include both constituents of synthetic and soluble oils, characteristics properties common to both synthetics and water soluble oils are presented.

Figure 8:
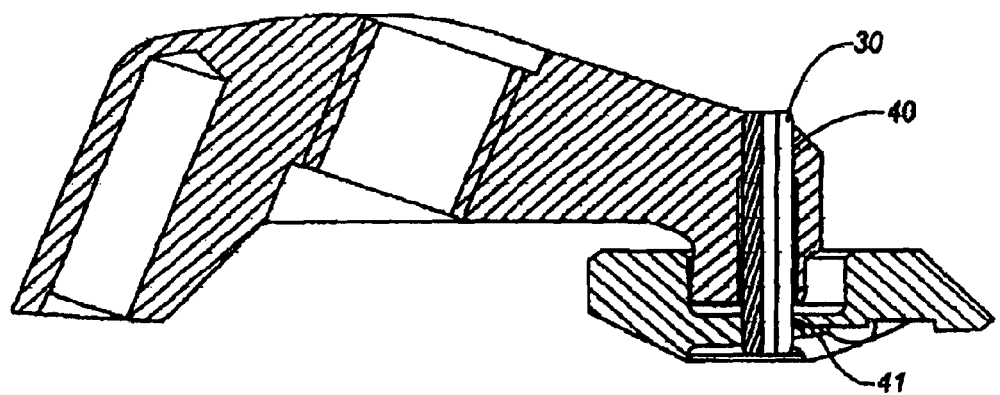
FIG. 8 is a cross section of a perspective view of the clamp and top piece fixed together with a slotted spring pin.

It will be appreciated that some handling benefits have been seen when the top piece 18 is fixed to the clamp 23. This arrangement reduces the chance that an operator will inadvertently drop the top piece when removing or installing the assembly. The most effective means of fixing the top piece 18 to the clamp 23 is with a slotted spring pin 39. The slotted spring pin 39 is inserted into a clamp bore 40 and a top piece bore 41 which are aligned as seen in FIG. 8. Although other means of fastening the pieces together are possible, the use of a slotted spring pin 39 allows for some rotation of the top piece 18 about the main axis of the slotted spring pin 39. This arrangement allows the top piece 18 to be aligned with the differing orientations of the insert 10.

Figure 9:
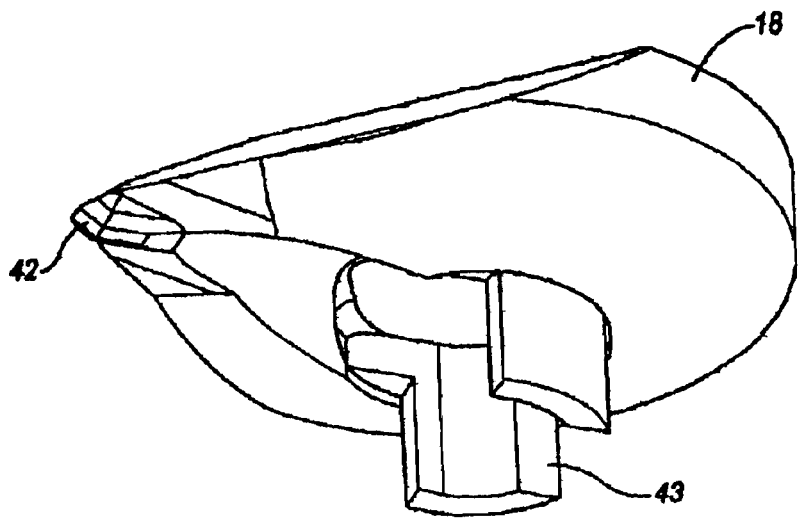
FIG. 9 is a view of the insert side of the top piece with a centering stud.
Figure 10:
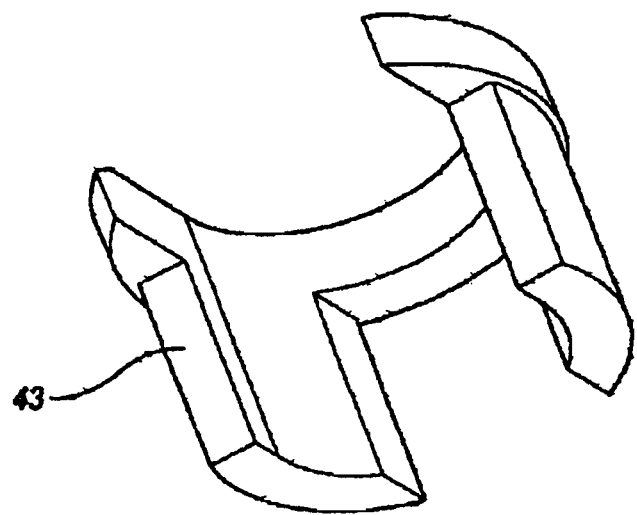
FIG. 10 is a perspective view of the centering stud.

A centering stud 43 can be included between the top piece 18 and insert 10. The centering stud 43 seats into the reservoir 34 and extends into the insert orifice 11. The shape of the centering stud conforms to the boundaries of the reservoir 34 and the insert orifice 11 and in this way the centering stud 43 acts as an alignment device. The centering stud has an open interior so that coolant flow is not restricted. FIG. 9 shows a centering stud fixed in the reservoir 34 of the top piece 18 and FIG. 10 is an isolated view of a centering stud. For illustrative purposes, the insert 10 is not shown in FIG. 9.

Figure 11:
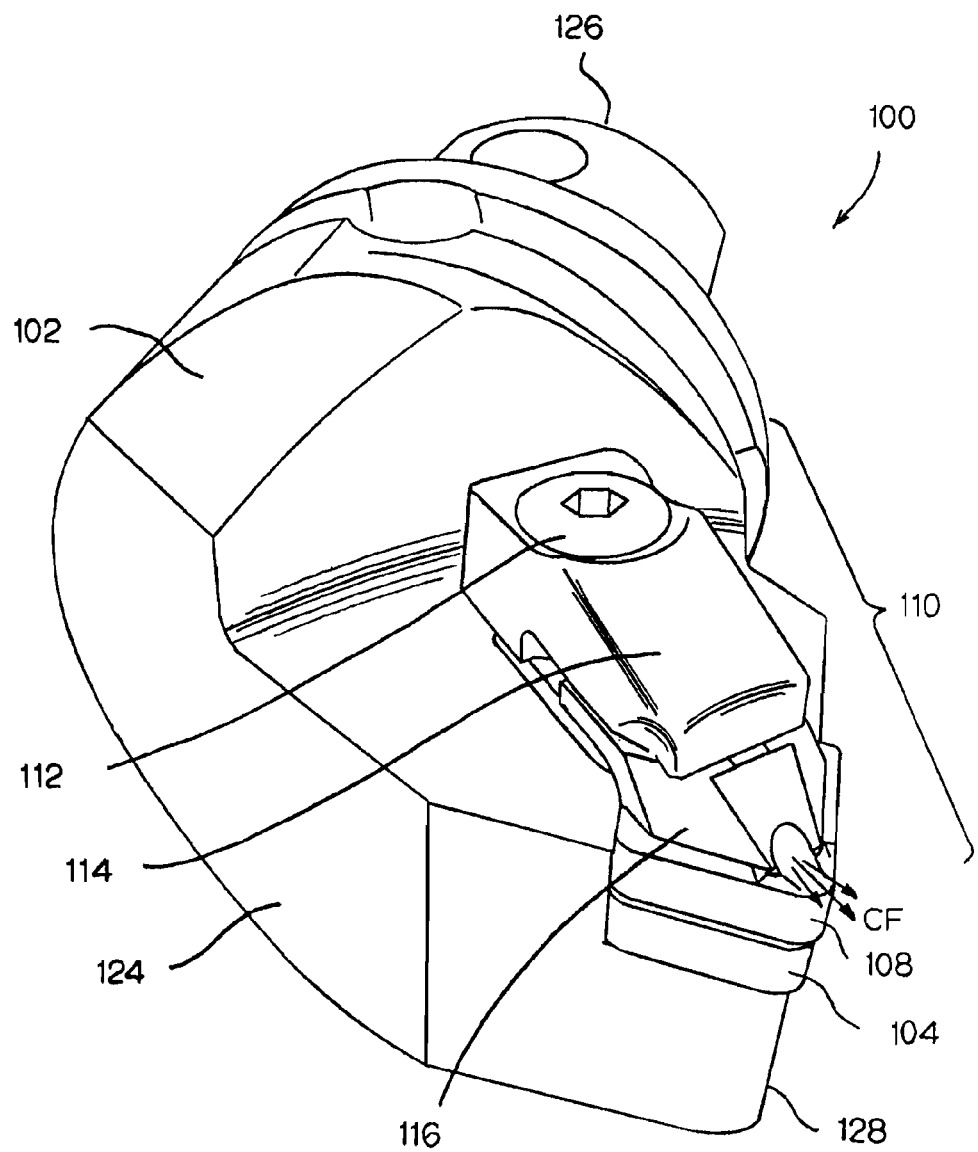
FIG. 11 is an isometric view of another specific embodiment of the cutting assembly, which comprises a holder and a cutting insert assembly
Figure 15:
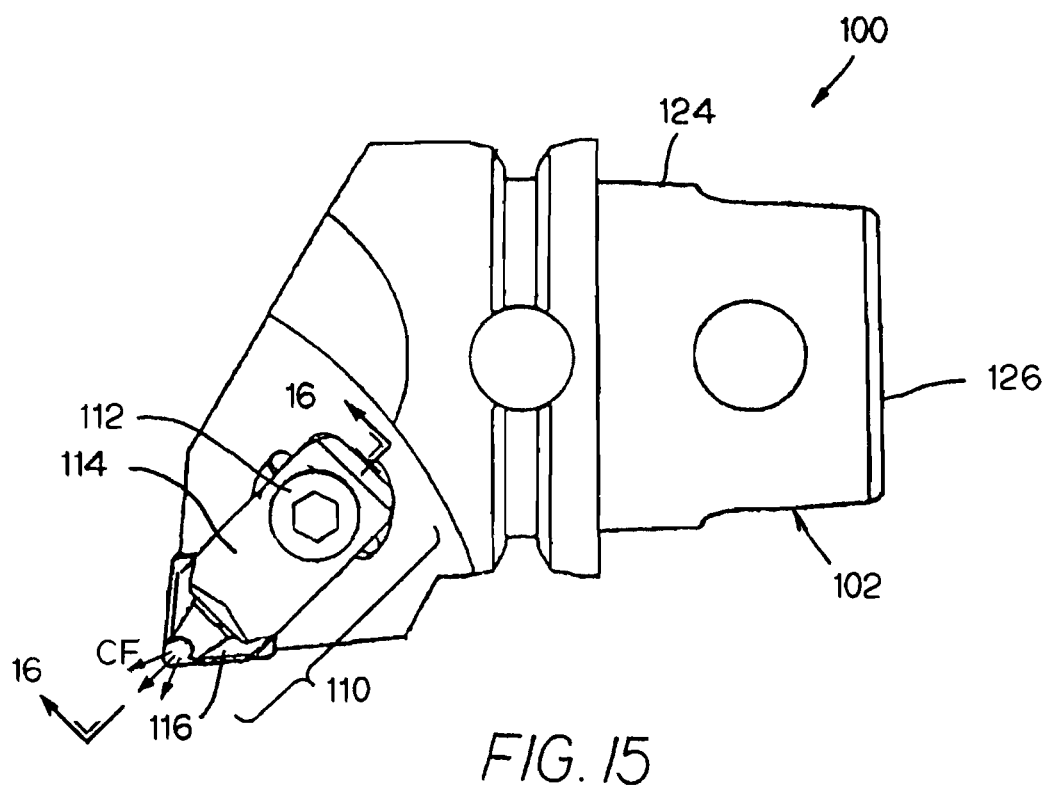
FIG. 15 is a top view of the specific embodiment of FIG. 11 wherein the cutting insert assembly attaches to the holder.
Figure 16:
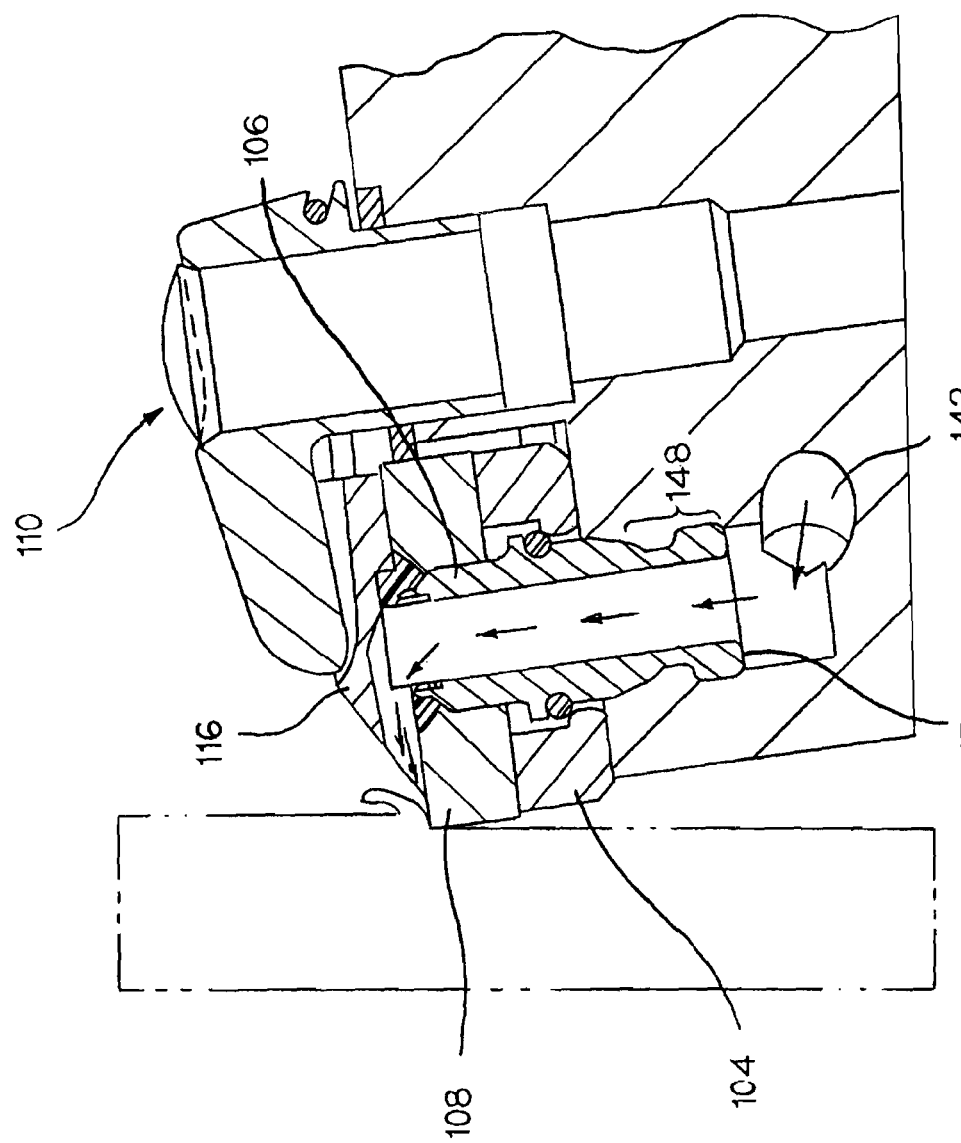
FIG. 16 is a cross-sectional schematic view of the specific embodiment of FIG. 15 taken along section line 16-16 showing the travel of coolant, as well as the engagement of the workpiece with the cutting insert to generate a chip.

Referring to FIG. 11 as well as other appropriate drawings, FIG. 11 is an isometric view that shows another specific embodiment of the cutting assembly generally designated as 100. This is a cutting assembly useful for an operation for chipforming removal of material from a workpiece. Cutting assembly 100 comprises the basic components of a holder 102, which is a style holder sold by Kennametal Inc., Latrobe, Pa. USA 15650 under the trademark KM. There should be an appreciation that different styles of holders are suitable for use. The holder should have an internal coolant delivery passageway, which communicates with a coolant source, and a seating region. The seating region has an opening in the seat wherein the opening is in fluid communication with the internal coolant passageway. The cutting assembly 100 further includes a shim 104, a locking pin 106, a cutting insert 108, and a clamp assembly 110. The clamp assembly 110 comprises an upstanding screw 112 and an arm 114, which projects away from the screw 112. A diverter plate 116 detachably connects to the arm 114, wherein at least a portion of the diverter plate 116 projects away from the arm 114 and covers at least a portion of the cutting insert 108. The clamp assembly 110 further includes a seal member 118, which has a resiliency so when under compression creates a seal with the diverter plate 116 and also creates a seal with the cutting insert 108.

Arrows CF in FIG. 11 represents the coolant flow spraying or exiting from the cutting assembly. The coolant sprays toward the discrete cutting location where the cutting insert engages the workpiece. As will be described in more detail hereinafter, the coolant spray moves along the radial coolant trough in the rake surface of the cutting insert. The geometry of the radial coolant trough causes the coolant to move in the upward direction away from the rake face and the outward direction away from the central insert aperture. The coolant exits the radial coolant trough in an upward and outward direction. The coolant spray impinges the underneath surface of the chip formed from the workpiece wherein the upward and outward movement of the coolant facilitates the impingement of the chip on the underneath surface thereof.

Referring to FIGS. 12 through 14 as well as other appropriate drawings, the holder 102 has a holder body 124, which has a forward end (or working end) 128 and a rearward end 126. The holder body 124 has a shank region (bracket 130) adjacent the rearward end 126 and a head region (bracket 132) adjacent the forward end 128. The head region 132 includes a seat generally designated as 136, which has a seating surface 138 and an upstanding support surface 140. As will become apparent hereinafter, the upstanding support surface 140 provides support for the shim and the cutting insert when secured to the seat 136.

The holder body 124 contains a coolant delivery passage 142, which has one end 144 and an opposite end 146. The opposite end 146 is in the seating surface 138. The coolant delivery passage 142 has a smooth frusto-conical section 147 adjacent the seating surface 138. The coolant delivery passage 142 further has a threaded section 148 next to the smooth frusto-conical section 147. See FIG. 14. In reference to the coolant delivery passage 142, the majority of the passage 142 comprises a generally cylindrical conduit 150 that moves from the one end 144 to a point 151 where the passage 142 changes direction. A shorter portion 152 of the passage 142 then travels to the seating surface 138. Coolant enters the coolant delivery passage 142 through the one end 144. See FIG. 13.

Figure 21:
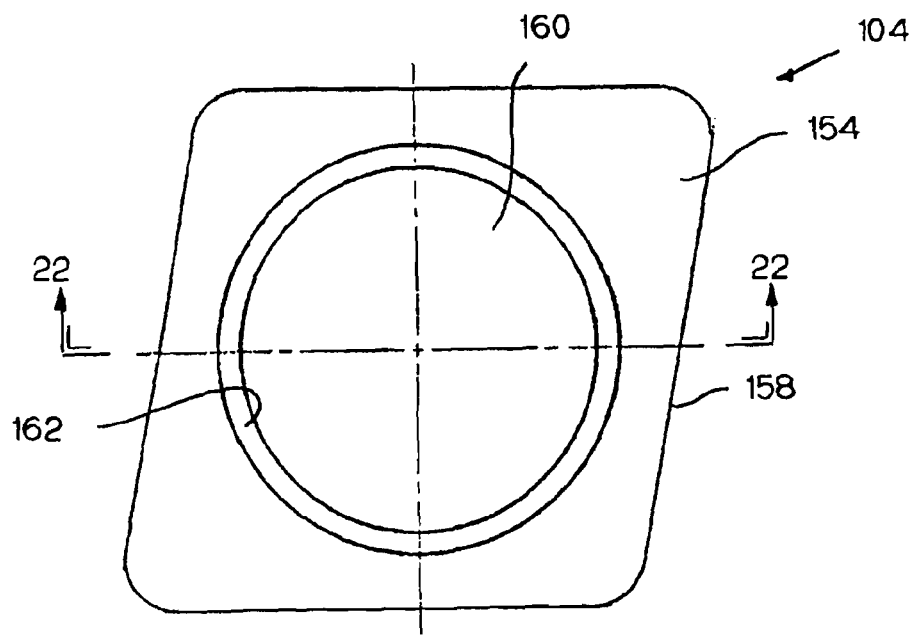
FIG. 21 is a top view of the shim.
Figure 22:
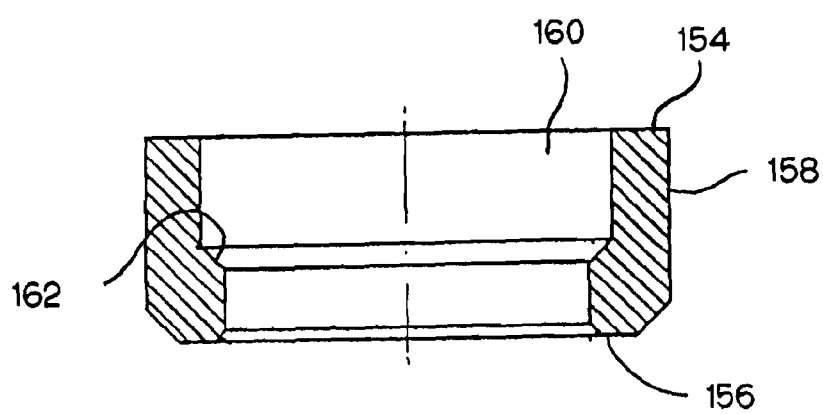
FIG. 22 is a cross-sectional view of the shim of FIG. 21 taken along section line 22-22 of FIG. 21.

Referring to FIGS. 21 and 22 as well as other appropriate drawings, the shim 104 has a generally polygonal geometry with a top surface 154, a bottom surface 156, and a flank surface 158. The shim 104 contains a central aperture 160 passing completely through the shim 104. The central aperture 160 has an annular lip 162 mediate the top surface 154 and the bottom surface 156 wherein the lip 162 projects into the volume of the central aperture 160. Annular lip 162 has a generally frusto-conical surface in cross-section. As will described in more detail hereinafter, the annular lip 162 provides a surface against which an O-ring seal deforms under compression to create a fluid-tight seal between the shim 104 and the locking pin 106. There should be an appreciation that the shim 104 may contain or cooperate with other structure, which performs the sealing function. Applicants do not contemplate that an O-ring is the only way to create the seal between the shim 104 and the locking pin 106.

Referring to FIGS. 18-20 as well as other appropriate drawings, the locking pin 106 has an elongate locking pin body 170, which has an axial top end 172 and an axial bottom end 174. Locking pin body 170 contains a central longitudinal bore 176 extending all the way through the locking pin body 170. The longitudinal bore 176 has a coolant inlet 178 and a coolant outlet 180. as will become apparent hereinafter, coolant enters at the coolant inlet 178, travels through the bore 176, and exits at the coolant outlet 180. The exterior surface of the locking pin body 170 has an annular shoulder 182 mediate of the axial top end 172 and the axial bottom end 174. Rearward of the shoulder 182 is an annular arcuate groove 183. The locking pin body 170 has a head region (bracket 184) adjacent the top end 172 and a shank region (bracket 186) adjacent the bottom end 174. The arcuate groove 183 in the locking pin body 170 carries a resilient O-ring seal 188. The exterior surface of the locking pin body 170 contains a threaded region 200 adjacent the bottom end 174 thereof. The locking pin body 170 further has a forward annular shoulder 202.

The locking pin 106 provides for a "pull back" feature upon complete tightening into the threaded section 148 of the coolant delivery passage 142. The locking pin 106 accomplishes this feature by a difference in the orientation of the longitudinal axis of the threaded section 200 as compared to the longitudinal axis of the remainder of the locking pin 170. FIGS. 18 and 20 illustrate this difference in orientation. In these drawings, the central longitudinal axis of the threaded region 200 and the longitudinal axis of the remainder of the locking pin are disposed apart an angle "Z". By "pull back", it is meant that upon complete tightening of the lock pin 106, the lock pin 106 urges the shim 104 and the cutting insert 108 toward the upstanding support surface 140. This feature enhances the integrity of the holding of the cutting insert 108 and shim 104 in the seat of the holder.

In reference to the specific cutting inserts, there are three basic cutting inserts; namely, the roughing cutting insert 420, the roughing medium cutting insert 422, and the finishing cutting insert 424. As will become apparent, each one of these cutting inserts (420, 422, 424), which is for use in a chipforming material removal operation, has a cutting insert body that has a seating surface and a flank face. There is a corner cutting region, which is at the intersection of the peripheral edge region and the flank face adjacent corresponding corners thereof, that has a peripheral edge. For the roughing insert 420, the corner cutting region 432 is at the intersection of the central peripheral edge region 452 and a pair of lateral peripheral edge regions 454, 456, and the adjacent flank face. For the medium roughing insert 422, the corner cutting region 532 is at the intersection of the central peripheral edge region 552 and a pair of lateral peripheral edge regions 554, 556, and the flank face. For the finishing insert 424, the corner cutting region 632 is at the intersection of the central peripheral edge region 652 and a pair of lateral peripheral edge regions 654, 656, and the flank face. As will become apparent from the description hereinafter, each one of the cutting inserts (420, 422, 424) has eight separate discrete corner cutting regions.

For each of the cutting inserts, the cutting insert body contains a central aperture that opens at the opposite seating surfaces. The central aperture has a mediate cylindrical section, which is bounded by a pair of frusto-conical mouth sections adjacent each seating surface.

As will be discussed hereinafter, for each one of the cutting inserts (420, 422, 424), the mediate cylindrical section of the central aperture has the same diameter. In these specific embodiments, the diameter of the mediate cylindrical section is equal to about 7.68 millimeters (mm). Further, in this specific embodiment, the frusto-conical surface that defines the frusto-conical mouth has a included angle equal to about 84°, 12'. By providing a mediate cylindrical section and frusto-conical mouth section with the same dimensioning, applicants have been able to develop a set of cutting inserts (420, 422, 424) that fit within a seat in one tool holder. It is advantageous to provide such a set of cutting inserts, which are useful for different applications, that can be used with a single tool holder.

The seating surface contains a coolant delivery trough that has a radial orientation toward a corresponding corner cutting region. The coolant delivery trough has a radial outward end terminating at the peripheral edge and a radial inward end opening into the central aperture. The cutting insert has a pair of lateral topographic regions wherein the one lateral topographic region is along one side of the coolant delivery trough and the other lateral topographic region is along other side of the coolant delivery trough.

FIGS. 32-36 illustrate the roughing cutting insert 420. FIGS. 37-41 illustrate the medium roughing cutting insert 422. FIGS. 42-46 illustrate the finishing cutting insert 424. Further, applicants note that the roughing cutting insert is shown in co-pending U.S. Design patent application Ser. No. 29/369,123 filed Sep. 2, 2010 for CUTTING INSERT by Chen et al. The medium roughing insert is shown in co-pending U.S. Design patent application Ser. No. 29/369,124 filed Sep. 2, 2010 for CUTTING INSERT by Chen et al. The finishing insert is shown in co-pending U.S. Design patent application Ser. No. 29/369,125 filed Sep. 2, 2010 for CUTTING INSERT by Chen et al. Applicants hereby incorporate by reference herein in their entirety the above-identified U.S. Design patent applications (Ser. No. 29/369,123, Ser. No. 29/369,124, and Ser. No. 29/369,125). A more detailed description of the cutting inserts now follows using FIGS. 32-46.

Referring to FIGS. 32-36, the roughing insert 420 has a roughing insert body 430 with a diamond-shaped geometry having eight discrete corner cutting regions 432. The roughing insert body 430 has a pair of opposite seating surfaces 434, 436 and a flank face 438, which extends about the periphery of the roughing insert body 430. As will be described hereinafter, when the roughing insert 420 is assembled to the cutting tool holder, one of the seating surfaces contacts the shim and the other seating surface contacts the diverter plate to create a seal therewith. The flank face 438 intersects the central peripheral edge region 452 and the pair of lateral peripheral edge regions 454, 456 to form cutting edges 440 at the corner cutting regions 432. One opposite pair of corner cutting regions 432 (upper right hand corner and lower left hand corner as viewed in FIG. 33) has an included angle "AAA" equal to about 80°. The other opposite pair of corner cutting regions 432 (upper left hand corner and lower right hand corner as viewed in FIG. 33) has an included angle "BBB" equal to about 100°. The structural features including the surfaces are essentially the same for each corner cutting region 432. The length of one side (and its opposite side) as measured by dimension "DD" in FIG. 33 is equal to 12.90 mm. The length of the other side (and its opposite side) as measured by dimension "EE" in FIG. 33 is equal to 12.70 mm.

The roughing insert body 430 contains a central aperture 444 that passes through the roughing insert body 432 whereby the central aperture 444 intersects both seating surfaces (434, 436). The central aperture 444 has a mouth (446, 448) at each one of the intersections with the seating surfaces (434, 436). The central aperture 444 has a generally cylindrical section between the mouths 446, 448.

Figure 32:
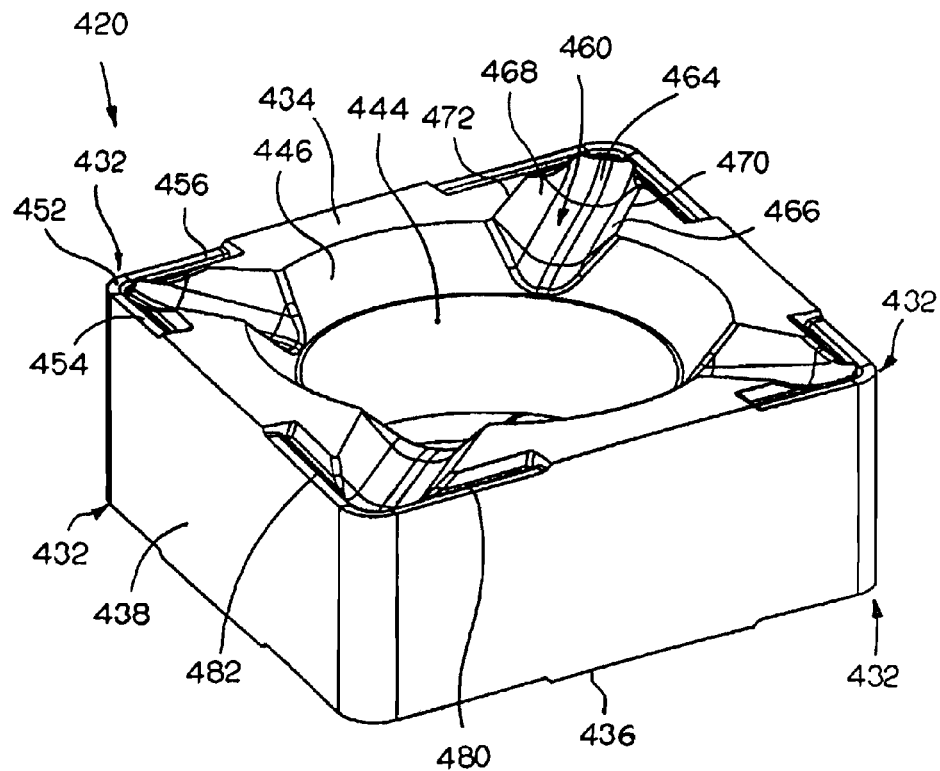
FIG. 32 is an isometric view of a specific embodiment of a roughing cutting insert.
Figure 32A:
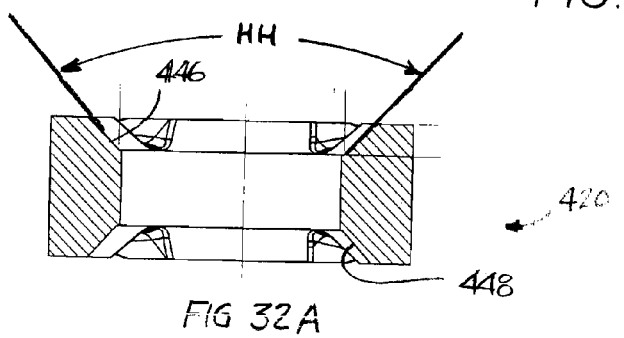
FIG. 32A is a cross-sectional view of the cutting insert of FIG. 32.

Referring to FIG. 32A, in this specific embodiment, the mouth, which has a generally frusto-conical shape, has an included angle "HH". In this specific embodiment, the angle HH is equal to 84° 12'. Referring to FIG. 33, in this specific embodiment, the diameter FF of the mediate cylindrical section is equal to about 7.68 mm.

There is a peripheral edge 450 that extends about the corner cutting region 432. The peripheral edge 450 is below the seating surface plane. FIG. 36 shows that the peripheral edge 450 is a distance "D" below the seating surface plane. The peripheral edge 450 has a central peripheral edge region 452 and a pair of lateral peripheral edge regions 454, 456 that extend away from the central peripheral edge region 452. The corner cutting region 432 may comprise all of or a part of the peripheral edge 450, depending upon the specific cutting operation. The corner cutting region 450 typically includes the central peripheral edge region 452.

At each corner cutting region 432 is a radial coolant trough 460. The radial coolant trough 460 has a radial inward end 462 that opens into the central aperture 444. In this embodiment, the radial coolant trough 460 does not intersect the cylindrical section of the central aperture 444. The radial coolant trough 460 has an arcuate bottom surface 464 and lateral flat side surfaces 466, 468 that terminate in lateral side edges 470, 472, respectively. There are smooth transitions between the arcuate surface and the flat side surface so as to facilitate the smooth and effective delivery of coolant through the radial coolant trough. The radial coolant trough 460 has a radial outward end 478 that terminates at a central notch 484 between the radial coolant trough 460 and the central peripheral edge 452. As shown in FIG. 36, in this specific embodiment, the peripheral edge region can be disposed at a rake angle (GG) between about 0 degrees and +5 degrees. As is apparent from the drawings, the arcuate bottom surface 464 of the radial coolant trough 460 moves toward the rake surface in the radial outward direction. In other words, the depth of the radial coolant trough 460 decreases as the trough 460 in the radial outward direction.

A lateral topographic region is along each lateral side edge of the radial coolant trough. There is a pair of peripheral notches 480, 482 that run along and are inside of the lateral peripheral edges 454, 456, except that the peripheral notches 480, 482 terminate at their intersection with the radial coolant trough 460.

Referring to FIGS. 37-41, the medium roughing cutting insert 520 has a medium roughing cutting insert body 530 with a diamond-shaped geometry having eight discrete corner cutting regions 532. The medium roughing cutting insert body 530 has a pair of opposite seating surfaces 534, 536 and a flank face 538, which extends about the periphery of the medium roughing cutting insert body 530. As will be described hereinafter, when the medium roughing insert 422 is assembled to the cutting tool holder, one of the seating surfaces contacts the shim and the other seating surface contacts the diverter plate to create a seal therewith. The flank face 538 intersects the central peripheral edge region 552 and the pair of lateral peripheral edge regions 554, 556 to form cutting edges 540 at the corner cutting regions 532. One opposite pair of corner cutting regions 532 (upper right hand corner and lower left hand corner as viewed in FIG. 38) has an included angle "CCC" equal to about 80°. The other opposite pair of corner cutting regions 532 (upper left hand corner and lower right hand corner as viewed in FIG. 38) has an included angle "DDD" equal to about 100°. The structural features including the surfaces are the same for each corner cutting region 532. In this specific embodiment, the length of one side (and its opposite side) as measured by dimension "II" in FIG. 38 is equal to 12.90 mm. In this specific embodiment, the length of the other side (and its opposite side) as measured by dimension "JJ" in FIG. 38 is equal to 12.70 mm.

Figure 37:
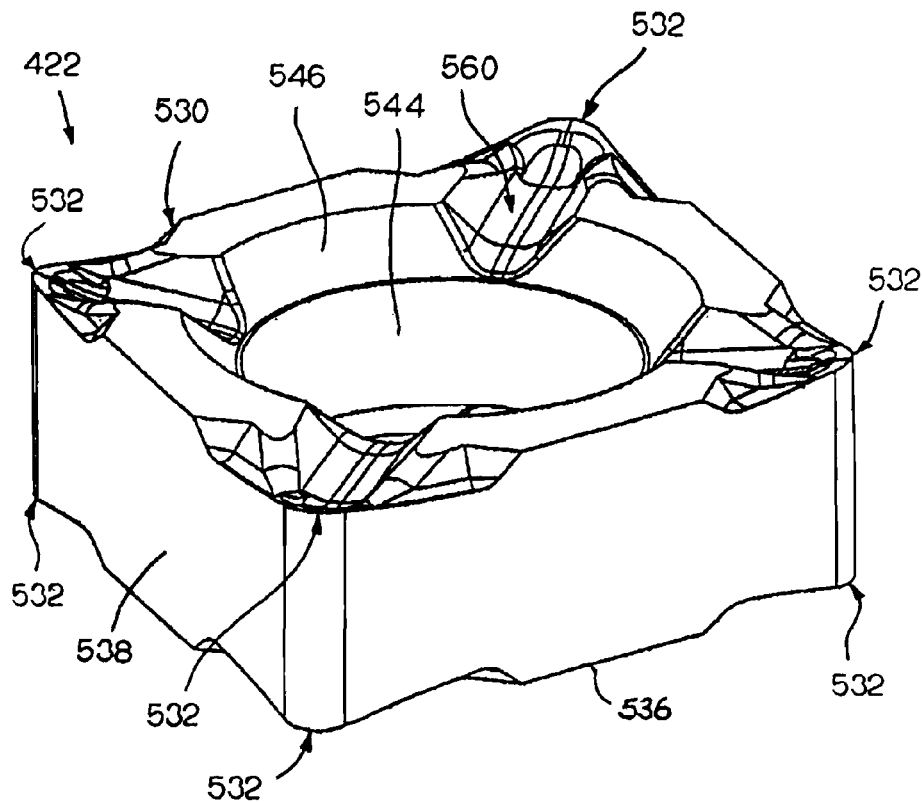
FIG. 37 is an isometric view of a specific embodiment of a medium roughing cutting insert.
Figure 37A:
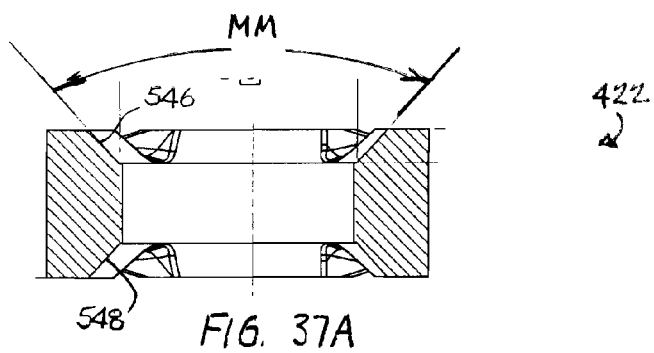
FIG. 37A is a cross-sectional view of the cutting insert of FIG. 37.
Figure 42:
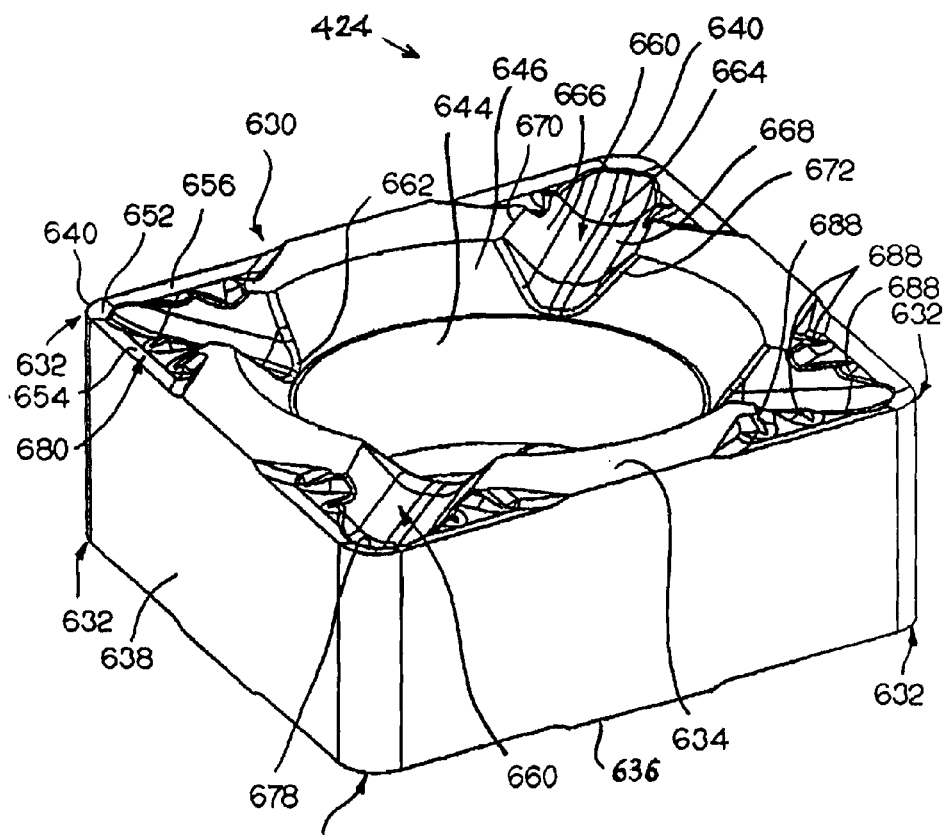
FIG. 42 is an isometric view of a specific embodiment of a finishing cutting insert.
Figure 42A:
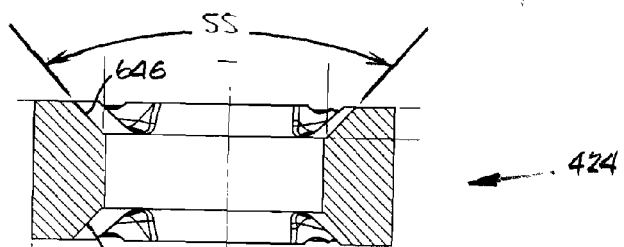
FIG. 42A is a cross-sectional view of the cutting insert of FIG. 42.

The medium roughing cutting insert body 532 contains a central aperture 544 that passes through the medium roughing cutting insert body 532 whereby the central aperture 544 intersects both seating surfaces (534, 536). The central aperture 544 has a mouth (546, 548) at each one of the intersections with the seating surfaces (534, 536). The central aperture 544 has a generally cylindrical section between the mouths 546, 548. Referring to FIG. 37A, in this specific embodiment, the mouth, which has a generally frusto-conical shape, has an included angle "MM". In this specific embodiment, the angle MM is equal to 84°12'. Referring to FIG. 38, the diameter KK of the mediate cylindrical section is equal to about 7.68 mm.

There is a peripheral edge 550 that extends about the corner cutting region 532. The peripheral edge 550 is below the seating surface plane. FIG. 41 shows the peripheral edge 650 is a distance "E" below the seating surface plane. The peripheral edge 550 has a central peripheral edge region 552 and a pair of lateral peripheral edge regions 554, 556 that extend away from the central peripheral edge region 552.

At each corner cutting region 532 is a radial coolant trough 560. The radial coolant trough 560 has a radial inward end 562 that opens into the central aperture 544. In this embodiment, the radial coolant trough 560 does not intersect the cylindrical section of the central aperture 544. The radial coolant trough 560 has an arcuate bottom surface 564 and lateral side surfaces 566, 568 that terminate in lateral side edges 570, 572, respectively. There are smooth transitions between the arcuate surface and the flat side surface so as to facilitate the smooth and effective delivery of coolant through the radial coolant trough. The radial coolant trough 560 has a radial outward end 578 that terminates at the central peripheral edge region 552. As shown in FIG. 41, in this specific embodiment, the peripheral edge region can be disposed at a rake angle (LL) between about +10 degrees and +14 degrees. As is apparent from the drawings, the arcuate bottom surface 564 of the radial coolant trough 560 moves toward the rake surface in the radial outward direction. In other words, the depth of the radial coolant trough 560 decreases as the trough 560 in the radial outward direction.

A lateral topographic region is along each lateral side edge of the radial coolant trough. There is a lateral notch 580 to each side of and spaced slightly apart from the radial coolant trough 560. Each lateral notch 580 has a forward-facing beveled face 582. The peripheral edge 550 terminates at the forward-facing beveled face 582. The notch 580 also has a beveled lateral face 584 that runs parallel to the radial coolant trough 560, and which decreases in area from the intersection with the forward-facing beveled face 582 and its forward point of termination at the peripheral edge 550.

Referring to FIGS. 42 through 46, the finishing insert 424 has a finishing insert body 630 with a diamond-shaped geometry having eight discrete corner cutting regions 632. The finishing insert body 630 has a pair of opposite seating surfaces 634, 636 and a flank face 638, which extends about the periphery of the finishing insert body 630. As will be described hereinafter, when the finishing insert 424 is assembled to the cutting tool holder, one of the seating surfaces contacts the shim and the other seating surface contacts the diverter plate to create a seal therewith. The flank face 638 intersects the central peripheral edge region 652 and the pair of lateral peripheral edge regions 654, 656 to form cutting edges 640 at the corner cutting regions 632. One opposite pair of corner cutting regions 632 (upper right hand corner and lower left hand corner as viewed in FIG. 43) has an included angle "EEE" equal to about 80°. The other opposite pair of corner cutting regions 632 (upper left hand corner and lower right hand corner as viewed in FIG. 43) has an included angle "FFF" equal to about 100°. The structural features including the surfaces are the same for each corner cutting region 632. In this specific embodiment, the length of one side (and its opposite side) as measured by dimension "OO" in FIG. 43 is equal to 12.90 mm. In this specific embodiment, the length of the other side (and its opposite side) as measured by dimension "PP" in FIG. 43 is equal to 12.70 mm.

The finishing insert body 632 contains a central aperture 644 that passes through the finishing insert body 632 whereby the central aperture 644 intersects both seating surfaces (634, 636). The central aperture 644 has a mouth (646, 648) at each one of the intersections with the seating surfaces (634, 636). The central aperture 644 has a generally cylindrical section between the mouths 646, 648. Referring to FIG. 43A, in this specific embodiment, the mouth, which has a generally frusto-conical shape, has an included angle "SS". In this specific embodiment, the angle SS is equal to 84°12'. Referring to FIG. 43, in this specific embodiment, the diameter QQ of the mediate cylindrical section is equal to about 7.68 mm.

There is a peripheral edge 650 that extends about the corner cutting region 632. The peripheral edge 650 is below the seating surface plane. FIG. 46 illustrates that the peripheral edge 650 is a distance "F" below the seating surface plane. The peripheral edge 650 has a central peripheral edge region 652 and a pair of lateral peripheral edge regions 654, 656 that extend away from the central peripheral edge region 652.

At each corner cutting region 632 is a radial coolant trough 660. The radial coolant trough 660 has a radial inward end 662 that opens into the central aperture 644. In this embodiment, the radial coolant trough 660 does not intersect the cylindrical section of the central aperture 644. The radial coolant trough 660 has an arcuate bottom surface 664 and lateral side surfaces 666, 668 that terminate in lateral side edges 670, 672, respectively. The radial coolant trough 660 has a radial outward end 678 that terminates at the central peripheral edge region 652. As shown in FIG. 46, in this specific embodiment, the peripheral edge region can be disposed at a rake angle (RR) between about +12 degrees and +15 degrees. As is apparent from the drawings, the arcuate bottom surface 664 of the radial coolant trough 660 moves toward the rake surface in the radial outward direction. In other words, the depth of the radial coolant trough 660 decreases as the trough 660 in the radial outward direction.

A lateral topographic region is along each lateral side edge of the radial coolant trough. There is a lateral notch 680 to each side of the radial coolant trough 660. Each lateral notch 680 has a forward-facing beveled face 682. The peripheral edge 650 terminates at the forward-facing beveled face 682. The lateral notch 680 also has a lateral face 684 that runs parallel to the radial coolant trough 660, and which decreases in area from the intersection with the forward-facing beveled face 682 and its forward point of termination at the peripheral edge 650. There is a pair of small projections 688 on the lateral face 684, which extend from the joinder with the radial coolant trough 660. The small projections 688 help prevent the chips from entering the radial coolant trough. Further, the small projections facilitate the breakage of chips. The size and orientation and number of the projections may vary to accommodate different applications.

For each cutting insert, it is apparent that the radial coolant trough has an origin proximate to the central cutting insert aperture and a termination proximate to and spaced radially inward from the corner cutting edge region. The radial coolant trough has a depth decreasing from the origin to the termination. The coolant when exiting the radial coolant trough travels in an upward direction away from the rake surface.

Referring to FIGS. 28-30 as well as other appropriate drawings, the seal member 118 has a generally circular body 250, which has a central aperture 252 and a circumferential edge 254. The top surface 256 of the generally circular body 250 is generally flat and the bottom surface 258 is generally frusto-conical in shape. A generally cylindrical top upstanding collar 262 projects away from the flat top surface 256 of the generally circular body 250. The top upstanding collar 262 has a distal circular edge 264.

There is an opening 266 in the collar and a corresponding opening 268 in the generally circular body 250. The combination of these openings (266, 268) permits the flow of coolant (see arrows CF in FIG. 28) to the cutting insert as will be described hereinafter. The frusto-conical bottom surface 258 has a generally circular terminal edge 276. The diameter (X in FIG. 30) of the circular opening defined by the circular terminal edge 276 is larger than the diameter (Y in FIG. 30) of the circular opening defined by the distal circular edge 264 of the upstanding collar 262.

As one alternative, seal 118 is made of a resilient material such as a plastic material that is compressible to form a fluid-tight seal. There may be other alternative materials, which are not necessarily plastics, but which provide for the necessary resilience or compressibility to create the seal when under compression. As will be described hereinafter, the seal 118 creates a seal with each one of the diverter plate 116, the locking pin 106 and the cutting insert 108.

Referring to FIGS. 23-24 as well as other appropriate drawings, the clamp assembly 110 includes the screw 112, which has an upper end 280 and a lower end 282. The screw 112 has a head portion 284 and a threaded section 286. The clamp assembly 110 further includes the arm 114. The arm 114 has a proximate end 300 and a distal end 302. The arm 114 also has a base section 304, which contains an aperture 306, adjacent to the proximate end 300. The base section 304 also has a cylindrical section 305. The screw 112 is rotatable within the aperture 306 of the base section 304. The head portion 284 and a C-shaped resilient split ring (or clip) 287 retain the screw 112 in the aperture 306.

The arm 114 further has a finger section 312, which is integral with the base section 304, extends toward the cutting insert when the components are in the assembled condition. The finger 312 terminates at the distal end 302 of the clamp arm 114. The clamp arm 114 has a bottom surface 314, which defines a central shoulder 316 and a pair of opposite lateral recesses 318, 320.

Figure 25:
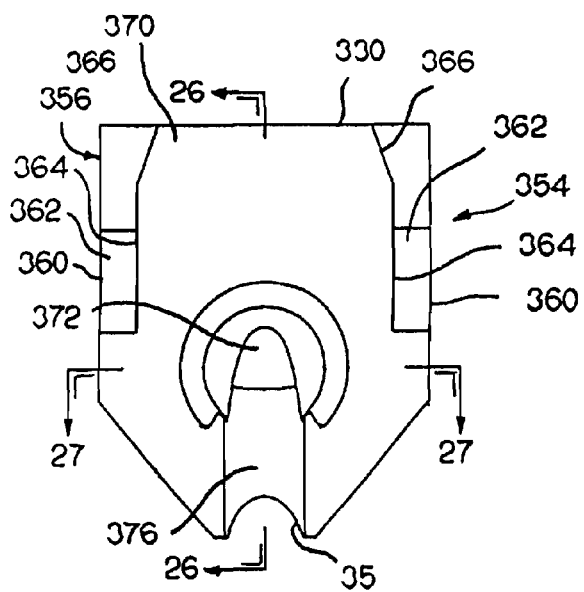
FIG. 25 is a bottom view of the diverter plate.
Figure 26:
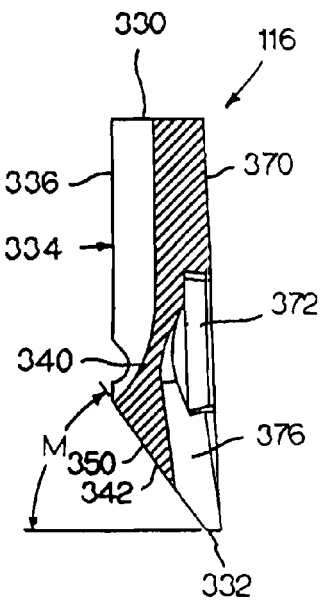
FIG. 26 is a cross-sectional view of the plate of FIG. 25 taken along section line 26-26 of FIG. 25.
Figure 25A:
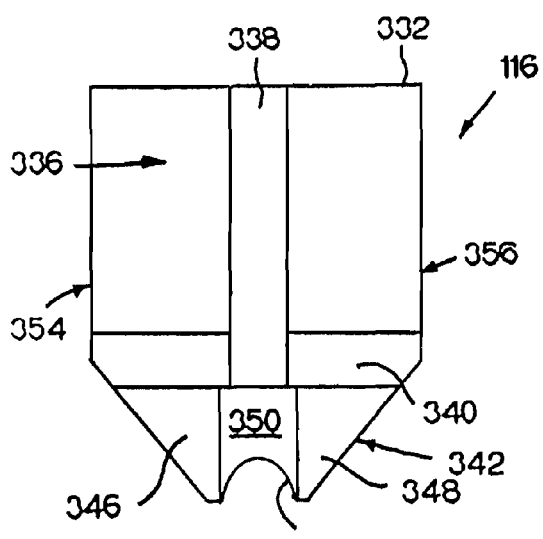
FIG. 25A is a top view of the diverter plate.
Figure 27:
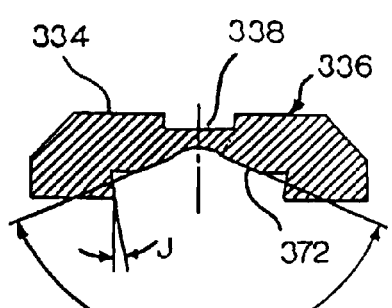
FIG. 27 is a cross-sectional view of the plate of FIG. 25 taken along section line 27-27 of FIG. 25.

Referring to FIGS. 25 through 27, as well as other appropriate drawings, the clamp assembly 110, which attaches to the holder and engages the cutting insert, further has a diverter plate 116, which has a proximate end 330, which is closest to the arm 114 and a distal end 332, which is farthest from the arm 114. The diverter plate 116 also has a top surface 334. The top surface 334 has a flat surface portion 336, which contains a central groove 338 therein. The top surface 334 further has a beveled surface portion 342 wherein a channel 340 separates the flat surface portion 336 from the beveled surface portion 342. The beveled surface portion 342 contains a pair of lateral surfaces 346, 348 and a central surface 350. The diverter plate 116 contains a central notch 352 in the central surface 350 at the distal end 332. The diverter plate 116 has a pair of opposite side surfaces 354, 356. Each side surface (354, 356) has a flat surface portion 360 and a notch portion 362. Each notch portion 362 has a flat portion 364 and a beveled portion 366. The diverter plate 116 has a bottom surface 370, which contains a generally circular depression or bowl 372 and an elongate channel 376, which extends away from the depression 370 toward the central notch 352.

The head portion 284 has a pair of spaced-apart prongs 288 that extend outwardly toward the cutting insert when the components are in the assembled condition. The prongs 288 have a generally inward bias. The prongs engage the diverter plate 116 to retain the diverter plate 116 to the clamp arm 114. More specifically, to assemble the diverter plate 116 to the clamp arm 114, the diverter plate 116 is positioned in alignment with the prongs 288. The beveled surface 366 at the proximate end 330 engage the prongs to spread them apart as the diverter plate 116 moves toward the cylindrical member 305. The prongs 288 bias inward toward the diverter plate 116 and are within the notches 362. The inward bias of the prongs 288 securely retains the diverter plate to the clamp arm 114. As one can appreciate, the diverter plate 116 can be detached from the clamp arm 114 by pulling the diverter plate 116 away from the base 304. By providing a diverter plate that easily attaches to the remainder of the clamp assembly, the material from which the diverter plate is made can vary, depending upon the cutting application. For example, the diverter plate 116 can be made of steel or carbide, depending upon the specific application. The capability to vary only the material of the diverter plate without changing the remainder of the clamping assembly is an advantage.

FIG. 26A illustrates an alternative diverter plate 116' that has a bottom surface 370' with an orientation such that the bottom surface 370' slopes away from the diverter plate body at an angle "H", which is equal to about 7 degrees. However, there should be an appreciation that angle "H" can vary depending upon the specific application or circumstance. Because of the orientation of the bottom surface 370', during the clamping process, the proximate end 331 first contacts the cutting insert prior to the balance of the plate contacting the cutting insert. This contact facilitates the seating of the seal on the cutting insert and the sealing between the cutting insert and the seal.

Figure 27A:
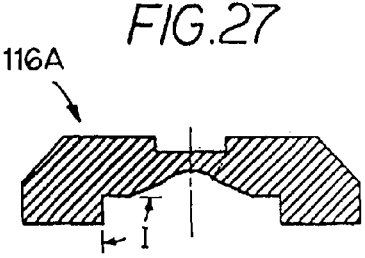
FIG. 27A is a cross-sectional view of still another specific embodiment of the diverter plate suitable for use with the clamp assembly wherein the cross section is like that of section line 27-27 in FIG. 25.

FIG. 27A illustrates another specific embodiment of the diverter plate 116A. The structure of the diverter plate 116A is the same as that of the diverter plate 116, except that the surfaces that help define the bowl are disposed at an angle "I" equal to about 90° to the adjacent surface of the bowl. This is in contrast to diverter 116 in which the surfaces that help define the bowl are disposed to the adjacent surface of the bowl at an angle "J" equal to about 10 degrees. However, there should be an appreciation that angle "J" can vary depending upon the specific application or circumstance.

Another specific embodiment combines the diverter plate and the seal into a one piece integral diverter plate. More specifically, this embodiment of the modified diverter plate has the same structural features as the diverter plate 116 and an integral protrusion that has the same structure as the seal 118. The integral protrusion has a coating thereon. The coating has elastomeric properties so upon compression, the coating creates a fluid-tight seal with the surface(s) that it contacts.

Figure 17:
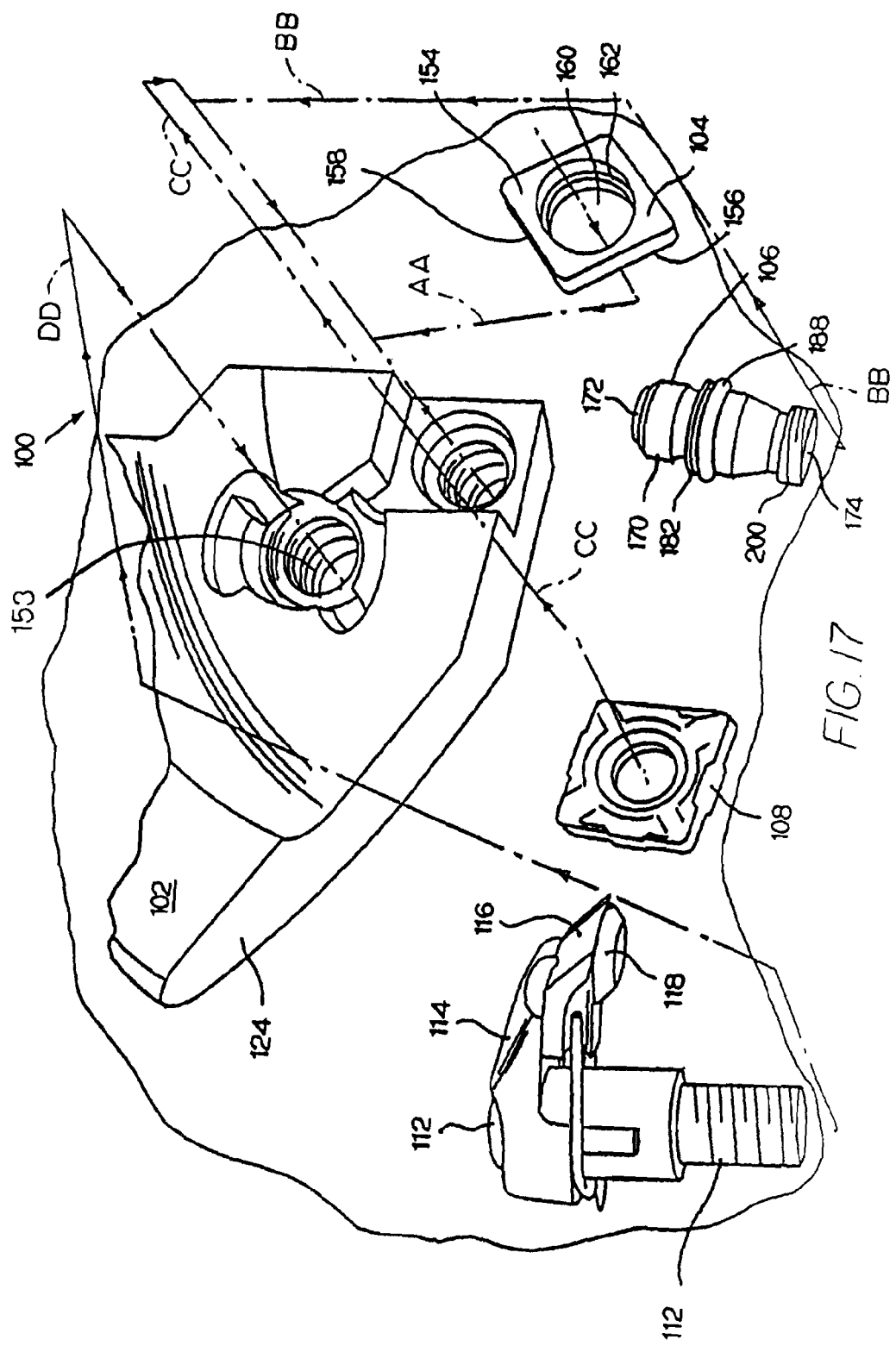
FIG. 17 is isometric view showing the assembly of the cutting insert assembly to the holder body.

Referring to the assembly of the components, FIG. 17 provides a visual guide to the assembly of the components. Initially, the shim 104 is positioned on the seating surface 138 of the seat 136 in the holder 102. The flank surfaces 158 of the shim 104 adjacent the upstanding wall 140 contact the surface of the wall 140. Arrow AA represents this step in the assembly process.

As the next step, the locking pin 106 is inserted into the outlet 146 of the coolant delivery passage 142 in the seating surface 138. The threaded region 200 of the locking pin 106 threadedly engages the threaded section 148 of the coolant delivery passage 142. The locking pin 106 is threaded until it is tightly secured in the coolant delivery passage 142. As is apparent, at least a part of the locking pin 106 is in the coolant delivery passage 142. The locking pin 106 tightly secures shim 104 to the seating surface of the seat. Arrows BB represent this step in the assembly process.

There should be an appreciation that once the locking pin 106 is securely affixed in the coolant delivery passage 142, the rearward surface of the shoulder 182 compresses the O-ring 188 against the lip 162 of the shim 104. The O-ring 188 creates a fluid-tight seal between the locking pin 106 and the shim 104. During operation, coolant cannot escape between the shim and locking pin.

As the next step, the cutting insert 108 is positioned on top of the shim 104. When in this position, the upper portion of the locking pin 106 is at least within some of the central aperture of the cutting insert 108. The frusto-conical mouth 220, which surrounds the central cutting insert aperture 219, tightly rests on the forward annular shoulder 202 of the locking pin 106 to form a fluid-tight seal. Arrows CC represent this step in the assembly process.

The next step in the assembly process comprises attaching the clamp assembly 110 to the holder 102. The threaded section 286 of the screw 112 threadedly engages the threaded clamp bore 153 in the holder 102. The clamp assembly 110 is tightened down into position where it retains the cutting insert 108 in position on top of the shim 104. As previously mentioned, the use of a diverter plate with a sloped surface facilitates the seating and sealing of the seal with respect to the cutting insert. In this regard, FIG. 26A illustrates the diverter plate 116' with a sloped rearward surface 370'. The rearward surface 370' slopes toward the cutting insert when the clam assembly is attached to the holder 102.

When in the securely tight position, the seal 118 compresses against the cutting insert 108 to form a fluid-tight seal with the cutting insert. The seal 118 also compresses against the bottom surface of the diverter plate 116 to form a fluid-tight seal with the diverter plate. As one can appreciate, the seal (seal member) 118 is mediate of the cutting insert and the diverter plate. The seal 118 provides a fluid-tight seal between the cutting insert and the diverter plate, and the seal member further provides a fluid-tight seal between the cutting insert and the locking pin. At this stage in the assembly process, the cutting assembly is ready to perform in an operation for chipforming removal of material from a workpiece.

In operation, the coolant, which is typically under pressure, enters the coolant delivery passage 142 via the one end 144. Coolant travels through the coolant delivery passage 142 towards the seating surface 138. The locking pin 106 is threaded fully into the coolant delivery passage 142 adjacent the other end 144 thereof. When in this condition, the axial bottom end 174 of the locking pin 106 is located into the coolant delivery passage 142. Coolant enters through the inlet 178 into the longitudinal bore 176 of the locking pin 106. Coolant flows through the longitudinal bore 176 and exits through the outlet 180 into the bowl of the diverter plate. In other words, the longitudinal locking pin bore opens to the diverter plate whereby coolant flows into the diverter bowl.

There should be an appreciation that when the locking pin 106 is threaded fully in the coolant delivery passage 142, there are several locations that provide fluid-tight seals which help contain the coolant. The threads engage the threaded portion to create a fluid-tight seal to, at least, provide an engagement that restricts the leakage of coolant at the threaded portion of the coolant delivery passage 142. The locking pin body 170 is pressed firmly against the smooth frusto-conical surface of the coolant delivery passage 142 adjacent the other end 146 thereof. The surface-to-surface engagement is tight to create a fluid-tight seal between the locking pin 106 and the smooth frusto-conical surface that defines the coolant delivery passage 142. The bottom surface of the shim is pressed tightly against the surface of the seat to provide a tight surface-to-surface engagement, which provides a fluid-tight seal. Finally, upon being compressed between the shim and the locking pin, the resilient O-ring 188 provides a fluid-tight seal between the shim and the locking pin so coolant cannot escape.

It is therefore apparent that there are multiple sealing points that provide fluid-tight seals. These seals comprise a locking pin-coolant delivery passage seal at the threaded portion, a locking pin-coolant delivery passage seal at the frusto-conical smooth surface, a shim-seating surface seal, and a locking pin-shim seal due to the O-ring. These multiple seals provide sealing integrity so little or essentially no coolant escapes as it travels from the coolant delivery passage into and through the locking pin.

As mentioned above, coolant flows through the longitudinal bore 176 of the locking pin 106 into the bowl (or depression) 372 of the diverter plate 116. The bowl 372, which has a generally circular geometry, receives the upstanding collar 262 of the seal 118. The dimensioning of the bowl 372 and the upstanding collar 262 is such so under compression, the seal 118 provides a fluid-tight connection with the diverter plate 116 at the locations of actual contact. As described hereinabove, there is an opening in the upstanding collar where the seal does not contact the diverter plate, and thus, there is an absence of a fluid-tight seal at this location. Coolant flows out of the seal opening (266, 268) to the diverter channel and then to the radial coolant trough of the cutting insert toward the corner cutting region.

When under compression, the seal 118 provides a fluid-tight seal with the cutting insert. More specifically, the frusto-conical surface 258 of the seal 118 compressively contacts the mouth of the central aperture to create a fluid-tight seal. Further, when under compression, the terminal circular edge 276 of the frusto-conical surface 258 compresses against the axial forward end of the locking pin 106. This compressive relationship between terminal circular edge 276 of the seal and the axial forward end of the locking pin creates a fluid-tight seal between the locking pin and the seal.

There should be an appreciation that there is a high degree of integrity in the containment of coolant as it exits the locking pin. There is a fluid-tight seal between the seal and the diverter plate, except for where the opening exists in the seal. There is a fluid-tight seal between the seal and the cutting insert. Finally, there is a fluid-tight seal between the seal and the locking pin.

Overall, it is apparent that there is a high of degree of integrity on the containment of coolant throughout the complete travel of coolant from the coolant delivery passage until it reaches the bowl in the diverter plate. The multiple points of fluid-tight seals comprise: a locking pin-coolant delivery passage seal at the threaded portion, a locking pin-coolant delivery passage seal at the frusto-conical smooth surface, a shim-seating surface seal, a locking pin-shim seal due to the O-ring, a seal-diverter plate seal via the upstanding collar, a seal-cutting insert seal adjacent the mouth surrounding the central aperture of the cutting insert, and a seal-locking pin seal adjacent the axial forward end of the locking pin.

Coolant flows out of the seal 118 via openings 266, 268 into the channel 376 of the diverter plate. The coolant travels through the channel 376 in a radial outward direction to where it exits the channel 376 adjacent the notch 350.

The cutting insert has an orientation relative to the coolant channel 376 and the notch 350 that upon exiting the channel 376, the coolant enters the radial coolant trough. There should be an appreciation that this is the case for any one of the three cutting inserts described hereinabove; namely, the roughing insert, the medium roughing insert and the finishing insert. Coolant then flows through the radial elongate channel exiting at the termination thereof to spray or jet toward the corner cutting edge region.

The coolant spray travels in a direction upward and outward from the radial coolant trough in the rake surface of the cutting insert. The coolant spray impinges the underneath surface of the chip formed from the workpiece during the cutting operation.

Figure 31:
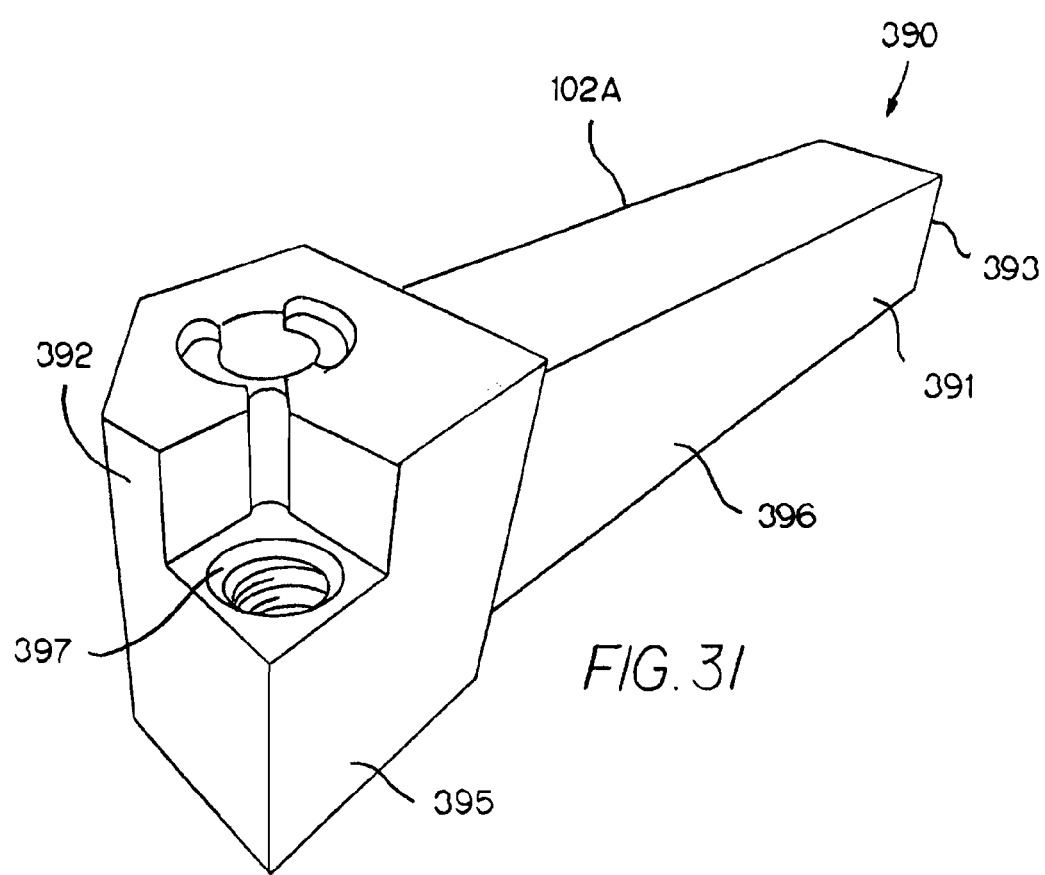
FIG. 31 is an isometric view of another embodiment of a holder suitable to receive the cutting insert assembly.

FIG. 31 is an isometric view of another embodiment of a holder suitable to receive the cutting insert assembly. This holder 390 has a holder body 391 with opposite axial forward end 392 and an axial rearward end 393. A shank 396 is adjacent the rearward end 393 and a head 395 is adjacent the forward end 392. There is a coolant port 397 in the seating portion of the head 395. FIG. 31A shows the coolant delivery passage 398 that enters from the rearward end of the holder body and extends all along the length thereof. FIG. 31B is an isometric view of a holder 390A like that of FIG. 31, but with the internal coolant passage 398A entering through the bottom of the holder. FIG. 31C is an isometric view of a holder 390B like that of FIG. 31, but with the internal coolant passage 398B entering through the bottom surface of the holder. There is an appreciation that the coolant delivery passage can enter into the holder in any one of a number locations, e.g., rear, side and bottom.

It is apparent that the present invention provides a cutting assembly, as well as a cutting insert assembly, to facilitate enhanced delivery of coolant adjacent the interface between the cutting insert and the workpiece (i.e., the insert-chip interface). By doing so, there is a diminishment of excessive heat at the insert-chip interface in the chipforming removal of material from a workpiece. By providing coolant flow, there is a reduction in excessive heat at the insert-chip interface to eliminate or reduce build up of chip material. By providing the flow of coolant to the insert-chip interface, the evacuation of chips from the insert-chip interface will be facilitated thereby minimizing the potential that a chip will be re-cut. It is apparent the present provides advantages connected with decreasing the heat at the insert-chip interface The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A medium roughing cutting insert for use in a chipforming material removal operation, the cutting insert comprising:

a cutting insert body having a seating surface and a flank face, a corner cutting region at the intersection of a peripheral edge and the flank adjacent corresponding corners thereof;

the cutting insert body containing a central aperture;

the seating surface containing a coolant delivery trough, the coolant delivery trough having a radial orientation toward a corresponding corner cutting region, the coolant delivery trough having a radial outward end terminating at the peripheral edge and a radial inward end opening into the central aperture;

a pair of lateral topographic regions wherein the one lateral topographic region is along one side of the coolant delivery trough and the other lateral topographic region is along other side of the coolant delivery trough; and, each one of the topographical regions comprising a lateral notch having a forward-facing beveled face and a beveled lateral face being generally parallel to the coolant delivery trough, and wherein the beveled lateral face decreases in area from an intersection with the forward-facing beveled face and a termination with the peripheral edge.

2. The medium roughing cutting insert according to claim 1 wherein the peripheral edge having a rake angle equal to between about +12 degrees and +15 degrees.

3. The medium roughing cutting insert according to claim 1 wherein the cutting insert body having an opposite seating surface, and the central aperture extending between the seating surfaces, the central aperture having a mediate cylindrical section and a frusto-conical mouth adjacent each of the rake surfaces.

4. The medium roughing cutting insert according to claim 3 wherein the frusto-conical mouth having an included angle equal to about 84 degrees and the mediate cylindrical section having a diameter equal to about 7.68 millimeters.

* * * * *